(12) United States Patent
Srinivasa

(10) Patent No.: US 11,651,199 B2
(45) Date of Patent: May 16, 2023

(54) METHOD, APPARATUS AND SYSTEM TO PERFORM ACTION RECOGNITION WITH A SPIKING NEURAL NETWORK

(71) Applicant: Intel Corporation, Santa Clara, CA (US)

(72) Inventor: Narayan Srinivasa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 349 days.

(21) Appl. No.: 16/644,446

(22) PCT Filed: Dec. 19, 2017

(86) PCT No.: PCT/US2017/067402
§ 371 (c)(1),
(2) Date: Mar. 4, 2020

(87) PCT Pub. No.: WO2019/074532
PCT Pub. Date: Apr. 18, 2019

(65) Prior Publication Data
US 2020/0218959 A1 Jul. 9, 2020

Related U.S. Application Data

(60) Provisional application No. 62/570,035, filed on Oct. 9, 2017.

(51) Int. Cl.
*G06N 3/04* (2006.01)
*G06K 9/62* (2022.01)
(Continued)

(52) U.S. Cl.
CPC ............ *G06N 3/049* (2013.01); *G06K 9/627* (2013.01); *G06K 9/6257* (2013.01);
(Continued)

(58) Field of Classification Search
None
See application file for complete search history.

(56) References Cited

U.S. PATENT DOCUMENTS

2014/0129496 A1  5/2014  Campos
2014/0229411 A1*  8/2014  Richert ................... G06T 7/246
706/16

(Continued)

FOREIGN PATENT DOCUMENTS

WO        2012167158        12/2012

OTHER PUBLICATIONS

International Search Report and Written Opinion from PCT/US2017/067402 dated Jul. 9, 2018, 14 pgs.
(Continued)

*Primary Examiner* — Delomia L Gilliard
(74) *Attorney, Agent, or Firm* — Essential Patents Group, LLP.

(57) ABSTRACT

Techniques and mechanisms for processing differential video data with a spiking neural network to provide action recognition functionality. In an embodiment, the spiking neural network is coupled to receive and process a first one or more spike trains which represent an encoded version of a sequence comprising frames of differential video data. In turn, the frames of differential video data are each based on a difference between a respective two frames of raw video data. Based on the processing of the first one or more spike trains, the spiking neural network may output a second one or more spike trains. In another embodiment, the second one or more spike trains are provided to train the spiked neural network to recognize an activity type, or to classify a video sequence as including a representation of an instance of the activity type.

25 Claims, 11 Drawing Sheets

(51) Int. Cl.
G06N 3/08 (2006.01)
G06V 20/40 (2022.01)
G06N 3/049 (2023.01)

(52) U.S. Cl.
CPC .......... G06N 3/0481 (2013.01); G06N 3/08 (2013.01); G06V 20/42 (2022.01)

(56) References Cited

U.S. PATENT DOCUMENTS

| | | | | |
|---|---|---|---|---|
| 2015/0269481 A1* | 9/2015 | Annapureddy | ...... | G06N 3/0481 706/21 |
| 2015/0341633 A1* | 11/2015 | Richert | .................. | H04N 19/50 375/240.16 |
| 2016/0232430 A1* | 8/2016 | Andreopoulos | ..... | H04N 19/136 |

OTHER PUBLICATIONS

Abbott, LF et al., "Building functional networks of spiking model neurons", Published in Nature Neuroscience 19(3): 350-355, Mar. 2016, 16 pgs.
International Preliminary Report on Patentability from PCT/US2017/067402 dated Apr. 23, 2020, 9 pgs.

* cited by examiner

METHOD, APPARATUS AND SYSTEM TO PERFORM ACTION RECOGNITION WITH A SPIKING NEURAL NETWORK

CLAIM OF PRIORITY

Claim of Priority

This Application is a National Stage Entry of, and claims priority to, PCT Application No. PCT/US2017/067402, filed on Dec. 19, 2017 and titled "METHOD, APPARATUS AND SYSTEM TO PERFORM ACTION RECOGNITION WITH A SPIKING NEURAL NETWORK", which claims priority to U.S. Provisional Patent Application No. 62/570,035 filed on Oct. 9, 2017 and titled "METHOD, APPARATUS AND SYSTEM TO PERFORM ACTION RECOGNITION WITH A SPIKING NEURAL NETWORK", which is incorporated by reference in its entirety for all purposes.

BACKGROUND

Embodiments described herein generally relate to neural networks, and more particularly, but not exclusively, relate to determining a classification of a video sequence with a spiking neural network.

Spiking neural networks (or "SNNs") are increasingly being adapted to provide next-generation solutions for various applications. SNNs variously rely on signaling techniques wherein information is communicated using a time-based relationship between signal spikes. As compared to typical deep-learning architectures—such as those provided with a convolutional neural network (CNN) or a recurrent neural network (RNN)—a SNN provides an economy of communication which, in turn, allows for orders of magnitude improvement in power efficiency.

Existing neural network technologies—e.g., those which include a recurrent neural network (RNN) such as long short-term memory (LSTM)—are used in some types of object recognition and other image analysis. In a conventional Deep Learning system for classifying a video sequence, features in individual raw video frames are identified ("extracted"), and a deep learning neural network is subsequently used to characterize a temporal relationship of the extracted features.

Configuring a conventional deep learning neural network system to recognize a given object (or activity) has to date required training of the system with a large number of reference images which variously represent objects of the same object/activity type. By contrast, humans are much more adept at learning object/activity types, due in part to our ability to analyze activity dynamically as it takes place over time. As the applications for neural networks continue to grow in number and variety, there is expected to be an increasing premium placed on improvements to efficient training—e.g., for image analysis and other applications.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
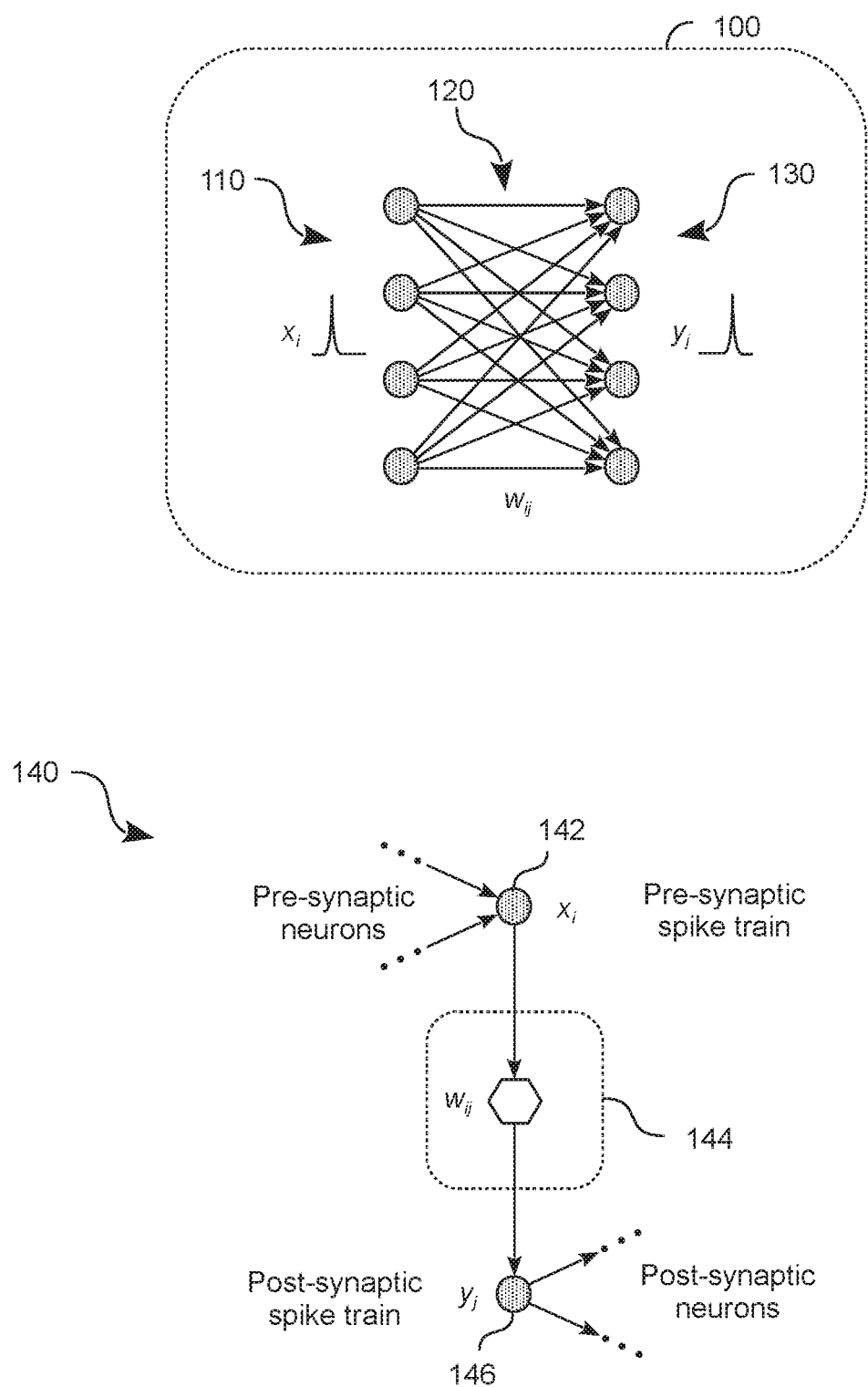
FIG. 1 shows diagrams each illustrating features of a simplified spiking neural network according to an embodiment.

Embodiments described herein variously provide neural network techniques and mechanisms using an encoding scheme wherein encoded data provides a representation of motion energy, as indicated (for example) by a difference between frames of a video sequence. Training of a spiked neural network using such encoded data may efficiently enable the spiked neural network to classify a real-world video sequence as representing one type of action—e.g., as opposed to sonic other type action which the neural network is also trained to recognize. A spiked neural network can thus be used to recognize an action, with very satisfactory results, based on training with only one reference video sequence that represents the action.

One challenge in machine learning is to build a neural network model that can learn from few examples. Embodiments described herein provide a reservoir based spiking neural model for learning to recognize actions—e.g., based on a limited number of reference videos. The exponential increase in digital data with online media, surveillance cameras among others, creates a growing need to develop intelligent models for complex spatio-temporal processing. State-of-the-art intelligent models require vast quantities of labeled data with extensive, iterative training to learn suitably and yield high performance. While the proliferation of digital media has led to the availability of massive raw and unstructured data, it is often impractical and expensive to gather annotated training datasets for all of them.

In a spiking neural network, nodes (or "neurons") communicate with one another using a time-based relationship between signal spikes, as opposed to the communication of data values which nodes use in typical deep-learning networks. While the class of spiking neural networks are capable of carrying out the same functions as other neural nets, the communication using spikes provides tremendous economy of information making these networks orders of magnitude more power-efficient. The time-dependent interaction via spikes turn these networks into rich dynamical systems, making them more powerful than the current generation of neural nets such as convolutional neural networks (CNNs) or recurrent neural networks (RNNs).

As used herein, "differential video data" refers to data which specifies, or is otherwise based on, a difference between image sensor outputs that correspond to different respective times. For example, input signals which are provided to a spiking neural network may be based on a sequence of frames of differential video data. One given frame of the sequence may include pixel values which variously correspond each to a different respective pixel of an image sensor field. One such pixel value may specify, or otherwise be based on, a difference between an imaging output which the corresponding pixel generates at one time and another imaging output which the corresponding pixel generates at another time. For example, a pixel of differential video data may indicate whether a difference between such imaging outputs exceeds some minimum threshold value. Accordingly, differential video data may represent motion energy of an action which has been captured by an image sensor. Encoding of raw video data to generate differential video data is referred to herein as differential video encoding or, alternatively, dynamic vision sensor (DVS) encoding.

A spiking neural network may be trained, in various embodiments, to detect any of one or more types of actions (also as referred to herein as an "action type" or "activity types"). Action detection (also referred to herein as "action recognition" or "activity recognition") may include classifying video information, based on one or more output signals generated with a spiking neural network, as including a representation of an action which is an instance of one such action type.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including a spiking neural network configured to process differential video data.

FIG. 1 illustrates an example diagram of a simplified neural network 100, providing an illustration of connections 120 between a first set of nodes 110 (e.g., neurons) and a second set of nodes 130 (e.g., neurons). Some or all of a neural network (such as the simplified neural network 100) may be organized into multiple layers—e.g., including input layers and output layers. It will be understood that the simplified neural network 100 only depicts two layers and a small number of nodes, but other forms of neural networks may include a large number of variously configured nodes, layers, connections, and pathways.

Data that is provided into the neutral network 100 may be first processed by synapses of input neurons. Interactions between the inputs, the neuron's synapses and the neuron itself govern whether an output is provided via an axon to another neuron's synapse. Modeling the synapses, neurons, axons, etc., may be accomplished in a variety of ways. In an example, neuromorphic hardware includes individual processing elements in a synthetic neuron (e.g., neurocore) and a messaging fabric to communicate outputs to other neurons. The determination of whether a particular neuron "fires" to provide data to a further connected neuron is dependent on the activation function applied by the neuron and the weight of the synaptic connection (e.g., $w_{ij}$) from neuron i (e.g., located in a layer of the first set of nodes 110) to neuron j (e.g., located in a layer of the second set of nodes 130). The input received by neuron i is depicted as value $x_i$, and the output produced from neuron j is depicted as value Thus, the processing conducted in a neural network is based on weighted connections, thresholds, and evaluations performed among the neurons, synapses, and other elements of the neural network.

In an example, the neural network 100 is established from a network of spiking neural network cores, with the neural network cores communicating via short packetized spike messages sent from core to core. For example, each neural network core may implement some number of primitive nonlinear temporal computing elements as neurons, so that when a neuron's activation exceeds some threshold level, it generates a spike message that is propagated to a fixed set of fanout neurons contained in destination cores. The network may distribute the spike messages to all destination neurons, and in response those neurons update their activations in a transient, time-dependent manner, similar to the operation of real biological neurons.

The neural network 100 further shows the receipt of a spike, represented in the value $x_i$, at neuron i in a first set of neurons (e.g., a neuron of the first set of nodes 110). The output of the neural network 100 is also shown as a spike, represented by the value which arrives at neuron j in a second set of neurons (e.g., a neuron of the first set of nodes 110) via a path established by the connections 120. In a spiking neural network all communication occurs over event-driven action potentials, or spikes. In an example, spikes convey no information other than the spike time as well as a source and destination neuron pair. Computations may variously occur in each a respective neuron as a result of the dynamic, nonlinear integration of weighted spike input using real-valued state variables. The temporal sequence of spikes generated by or for a particular neuron may be referred to as its "spike train."

In an example of a spiking neural network, activation functions occur via spike trains, which means that time is a factor that has to be considered. Further, in a spiking neural network, each neuron may provide functionality similar to that of a biological neuron, as the artificial neuron receives its inputs via synaptic connections to one or more "dendrites" (part of the physical structure of a biological neuron), and the inputs affect an internal membrane potential of the artificial neuron "soma" (cell body). In a spiking neural network, the artificial neuron "fires" (e.g., produces an output spike), when its membrane potential crosses a firing threshold. Thus, the effect of inputs on a spiking neural network neuron operate to increase or decrease its internal membrane potential, making the neuron more or less likely to fire. Further, in a spiking neural network, input connections may be stimulatory or inhibitory. A neuron's membrane potential may also be affected by changes in the neuron's own internal state ("leakage").

FIG. 1 also illustrates an example inference path NO in a spiking neural network, such as may be implemented by a form of the neural network 110 or other forms of neural networks. The inference path 140 of the neuron includes a pre-synaptic neuron 142, which is configured to produce a pre-synaptic spike train $x_i$ representing a spike input. A spike train is a temporal sequence of discrete spike events, which provides a set of times specifying at which time a neuron fires.

As shown, the spike train $x_i$ is produced by the neuron before the synapse (e.g., neuron 142), and the spike train $x_i$ is evaluated for processing according to the characteristics of a synapse 144. For example, the synapse may apply one or more weights, e.g., a weight $w_{xi}$, which are used in evaluating the data from the spike train $x_i$. Input spikes from the spike train $x_i$ enter a synapse such as synapse 144 which has a weight $w_{ij}$. This weight scales what the impact of the presynaptic spike has on the post-synaptic neuron (e.g., neuron 146). If the integral contribution of all input connections to a post-synaptic neuron exceeds a threshold, then the post-synaptic neuron 146 will fire and produce a spike. As shown, $y_j$ is the post-synaptic spike train produced by the neuron following the synapse (e.g., neuron 146) in response to some number of input connections. As shown, the post-synaptic spike train $y_j$ is distributed from the neuron 146 to other post-synaptic neurons.

Nodes of such a spiking neural network 100 may be of a Leaky Integrate-and-Fire (LIF) type—e.g., wherein, based on one or more spiking signals received at a given node j, the value of a membrane potential $v_m$ of that node j may spike and then decay over time. The spike and decay behavior of such a membrane potential $v_m$ may, for example, be according to the following:

$$\tau_m \left( \frac{dv_m}{dt} \right) \propto -(v_m - v_{rest}) + w_{ij} \cdot I_{ij} + J_b, \quad (1)$$

where $v_{rest}$ is a resting potential toward which membrane potential $v_m$ is to settle, $\tau_m$ is a time constant for decay of $v_m$, $w_{ij}$ is a weight assigned to a synapse coupled between another node i and node j, $I_{ij}$ is a spiking signal (or "spike train") communicated to node j via said synapse, and $J_b$ is a value that, for example, is based on another signal provided to node j from some other external node/source. In some embodiments, $J_b$ may be a bias current provided to node j. The spiking neural network may operate based on a predefined threshold voltage $V_{threshold}$, wherein the node j is configured to output a signal spike in response to its membrane potential $v_m$ being greater than (or equal to, in some embodiments) $V_{threshold}$.

Embodiments variously provide a reservoir-based spiking neural model that reliably learns to recognize actions in video data—e.g., by detecting time-based signatures of an action based on a small number of training examples. Some embodiments provide a novel encoding to generate spike signal information based on differential video data, while preserving a temporal correlation across different frames of raw video data. The reservoir may be configured to generalize a representation of a dynamic action toward signature action/movements, enabling it to learn from few training examples. Some embodiments provide an adaptation of a direct/autonomous model (D/A) based reservoir construction approach which introduces an approximate delay apportioning to configure a recurrent spiking model for practical action recognition based on limited video data. In this particular context, the terms "Auto" and "Autonomous" are used interchangeably herein.

In order to facilitate limited example training of a reservoir spiking framework, some embodiments variously provide a spike-based encoding/pre-processing method to convert the raw pixel valued video information in a dataset into spiking information that preserves the temporal statistics and correlation across different raw video frames. An emitted synchronous spike volley may thus rapidly input, as neural network stimulus, relatively more salient edges of image information, which often constitute more crucial information for action detection/recognition. In some embodiments, encoding may eliminate or otherwise mitigate less relevant spiking information due to ambiguity such as, noisy background activity or jitter (due to unsteady camera movement), further making the technique more robust and reliable. Hence, the encoding, in general, may capture more signature action or movement of a subject across different videos as spiking information. This, in turn, may enable the reservoir to recognize/generalize over motion cues from spiking data, to enable learning various types of actions from few video samples per action type/class. As compared to conventional solutions, the spiking model may be much more adept at learning object/activity types, due in part to an ability to analyze activity dynamically as it takes place over time.

Figure 2:
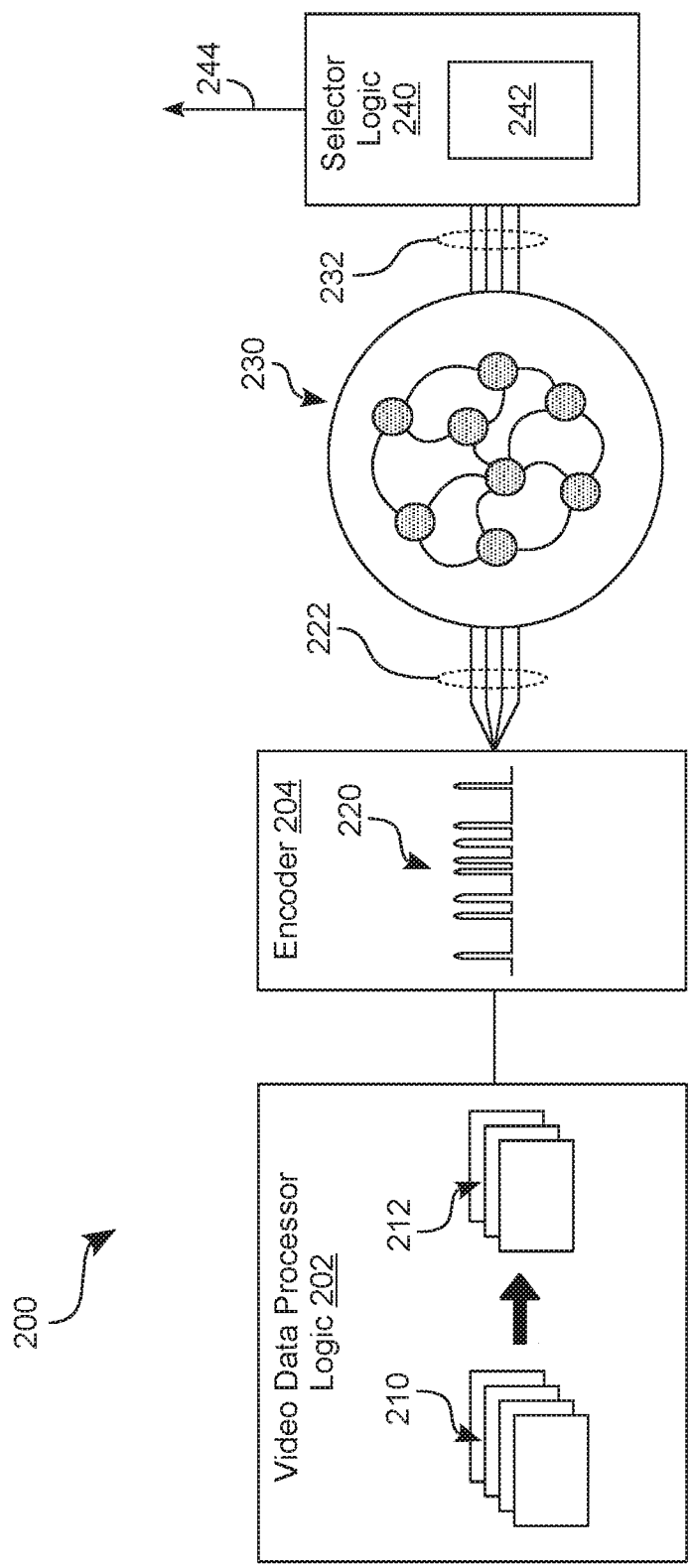
FIG. 2 is a functional block diagram illustrating features of a system to provide action recognition functionality according to an embodiment.

FIG. 2 shows a functional block diagram illustrating processing by a system 200 which, according to an embodiment, is to evaluate video information to provide action recognition functionality. System 200 includes a spiking neural network 230 coupled via input synapses 222 to receive input signaling such as the illustrative one or more input spike trains 220 shown. Spiking neural network 230 may include features of spiking neural network 100, for example.

In an embodiment, spiking neural network 230 is configured to process video information for at least one type of action detection. Nodes (or "neurons") of spiking neural network 230 may be variously coupled, each via a respective one of synapses 222, to receive a respective one of one or more input spike trains 220—some or all of which may represent, or otherwise be based on, differential video data. Based on the one or more input spike trains 220, one or more output signals may be generated with the spiking neural network, where the one or more output signals are subsequently used to train the network 230 to perform an action detection or, alternatively, are subsequently evaluated as part of such an action detection.

For example, as described herein, spiking neural network 230 may be trained, based on one or more input spike trains 220, to generate a particular type of output signaling which has been preassigned to correspond to (e.g., to be indicative of) a particular action type. Alternatively, an already-trained spiking neural network 230 may communicate (for example, via the illustrative synapses 232 shown) one or more output spike trains which are based on one or more input spike trains 220. Such one or more output spike trains may include an instance of the type of output signaling which corresponds to the action type.

By way of illustration and not limitation, system 200 may further comprise or couple to hardware and/or executing software (such as the illustrative selector logic 240 shown) which is to receive the one or more output spike trains via synapses 232. Selector logic 240 may include any of various processors, application specific integrated circuits (ASICs), field programmable gate arrays (FPGAs) and/or other circuitry configured to identify an action type as corresponding to the one or more output spike trains—e.g., wherein such identifying includes selecting one action type from a plurality of actions types which system 200 is trained to recognize. In the example embodiment shown, selector logic 240 may include or couple to reference data 242 which identifies one or more reference signal characteristics as being indicative of a given action type. Selector logic 240 may evaluate the one or more output spike trains based on such one or more reference characteristics to determine whether (or not) a particular action type is indicated by the one or more output spike trains. Selector logic 240 may output a signal 244 representing a result of such a determination.

In the embodiment shown, frames 212 of differential video data may be generated or otherwise determined—e.g., each based on frames 210 of raw video data variously representing images in a monochrome, RGB or other color space. Each of frames 212 may correspond to a respective two of frames 210, wherein any one of frames 212 represents a difference (weighted or otherwise) between the corresponding two of frames 210. In a simple example, a differential video frame $DF_x$ may be based on a difference $(RF_b - RF_a)$ between raw video frames $RF_a$, $RF_b$—e.g., wherein a value of a pixel of DE (the subscript "ij" indicating an ith pixel row and a ith pixel column) is based on a difference between respective values of a corresponding pixel $p_{ij}$ of $RF_b$ and a corresponding pixel $p_{ij}$ of $RF_a$. Such two raw video frames $RF_a$, $RF_b$ may be successive frames in a video sequence, or may otherwise be offset from one another by a time difference.

The one or more input spike trains 220 may be generated based on frames 212—e.g., wherein pixels of frames 212 are variously encoded as respective signal spikes of one or more input spike trains 220. Although some embodiments are not limited in this regard, system 200 may include (or alternatively, be coupled to) an encoder 204 to generate the one or more input spike trains 220 based on frames 212. Alternatively or in addition, system 200 may include or couple to an image sensor, integrated circuitry and/or other hardware such as the illustrative video data processor logic 202 shown—to generate frames 212 (and in some embodiments, frames 210).

Figure 3:
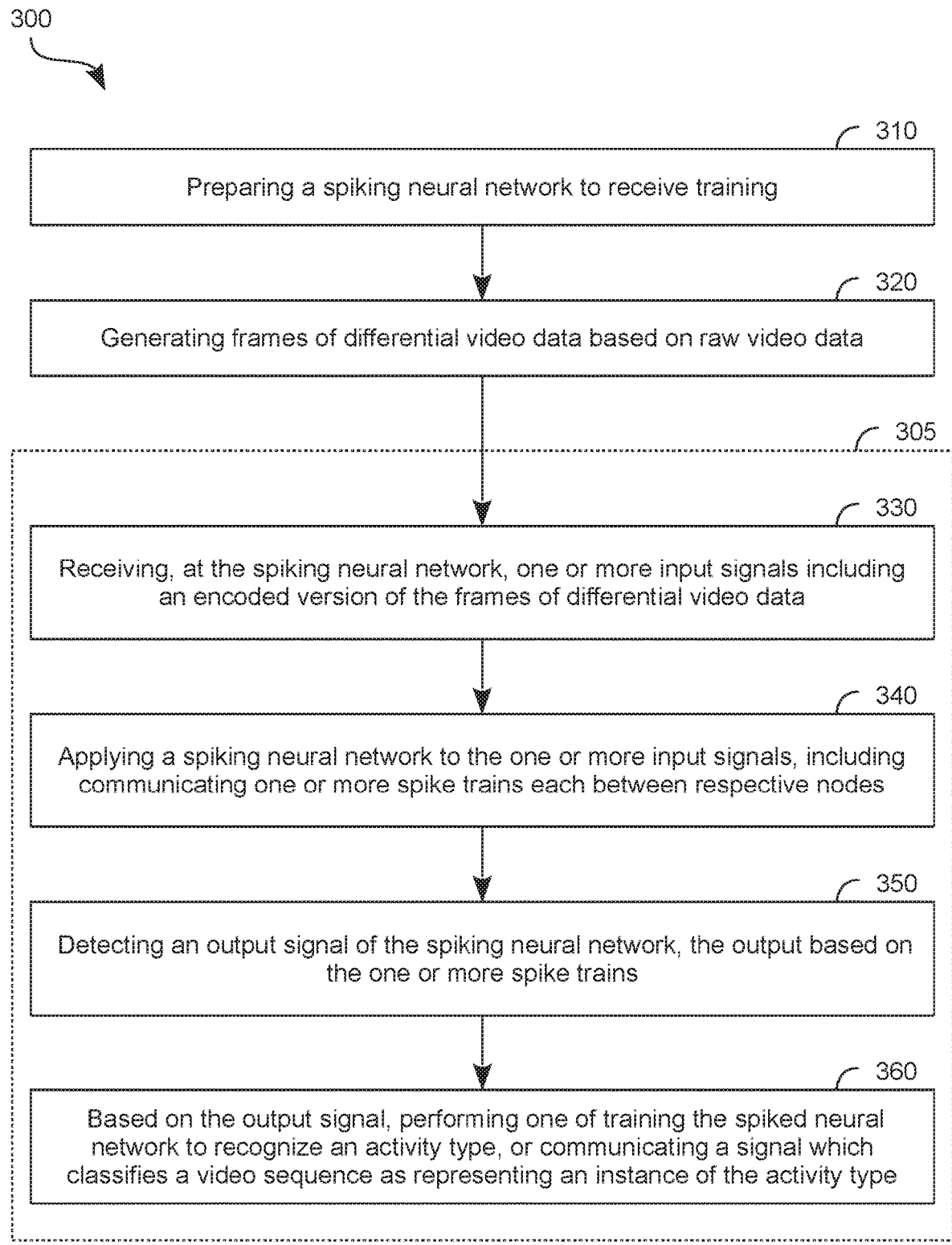
FIG. 3 is a flow diagram illustrating elements of a method to facilitate action recognition with a spiking neural network according to an embodiment.

FIG. 3 shows features of a method 300 to provide video classification (e.g., including action detection/recognition) based on spiked signaling which represents differential video data. Method 300 may be performed with circuit logic and/or other such hardware such as that of system 200 or neural network 100, for example. In an embodiment, method 300 is performed at least in part by an execution of software with a processor and a memory device coupled thereto.

Method 300 may include operations 305 to process signals with a spiking neural network. Although some embodiments are not limited in this regard, method 300 may additionally or alternatively include other processes to configuring the signals and/or the spiking neural network for operations 305. For example, such other processes may include (at 310) preparing a spiking neural network to receive training to detect an instance of a particular action type. The preparing at 310 may include building the spiking neural network using one or more neural network models. Building the spiking neural network may include changing synaptic weights to facilitate the generation of a particular neural network output e.g., where such output is predetermined a priori as the one to be associated with a particular action type. As discussed herein, some embodiments successively utilize two types of models (referred to as a "Direct" model type and an "Autonomous" model type) to build a spiking neural network.

Additionally or alternatively, such other processes may include (at 320) generating frames of differential video data based on raw video data. The generating may include calculating differences each between a respective two frames of video data. In some embodiments, pixel values of the differential video data may be variously weighted and/or selectively included in (or excluded from) an encoding process to generate input signaling for the spiking neural network.

In one embodiment, operations 305 comprises (at 330) receiving, at a spiking neural network, one or more input signals including an encoded version of frames of differential video data which, for example, are generated at 320. The frames of differential video data may be each include a respective pixel value representing a difference between a respective two frames of raw video data of a video sequence. Method 300 may further comprise (at 340) applying a spiking neural network to the one or more input signals, wherein the applying includes communicating one or more spike trains each between respective nodes of the spiking neural network. The one or more spike trains may each be based on the frames of differential video data—e.g., wherein a sequence of signal spiking by a given spike train is based on a sequence of the frames of differential video data.

The method may further comprise (at 350) detecting an output signal of the spiking neural network, wherein the output is based on the one or more spike trains. For example, the one or more output signals generated by the spiking neural network may be selected in preference to one or more other output signals of the neural network (e.g., wherein such output signals are all variously based on the one or more spike trains).

Based on the output signal, method 300 may (at 360) perform one of training the spiked neural network to recognize an action type, or classifying a video sequence as including a representation of an instance of the action type. A training of the spiked neural network to recognize a particular action type may be based, for example, on only a single reference video sequence which represents an instance of the action type. Alternatively, such training may be based on multiple reference video sequences which each include a respective representation of the same instance or different instances of the action type. In one embodiment, of all reference video sequences used to train the network to recognize a given action type, only one such reference video sequence may represent an instance of the action type as imaged from a first point-of-view. For example, each reference video sequence used to train the network to recognize the given action type may represent an instance of the action type as imaged from a different respective point-of-view.

Operations 305 may further comprise processing (not shown) to generate the one or more input signals based on frames of differential video data which, for example, are generated at 320. In such an embodiment, this additional processing may comprise, for each of one or more of the frames of differential video data, selectively excluding at least a portion the frame from a conversion to generate the one or more input signals. For example, a frame of differential video data may be selectively excluded, on a per-frame basis, from encoding to generate the one or more input signals. Additionally or alternatively, a sub-frame portion of a given differential video frame may be selectively excluded from the conversion on a per-sub-frame basis (e.g., where another sub-frame portion of that same frame is included in the encoding/conversion).

Selectively filtering frames on a per-frame basis may include foregoing an encoding of an entire frame where a total amount of action indicated by the frame (e.g., by a sum of pixel values thereof) is above some predetermined maximum threshold level. Alternatively or in addition, an entire frame may be filtered on a per-frame basis where a total amount of action indicated by the frame is below some predetermined minimum threshold level. Similarly, selectively filtering a sub-frame portion of a given frame on a per-sub-frame basis may include foregoing an encoding of the sub-frame—but not necessarily another sub-frame of that same frame—where a total amount of activity indicated by the sub-frame (e.g., by a sum of pixel values thereof) is above some predetermined maximum threshold level. Alternatively or in addition, a sub-frame of a given frame may be filtered on a per-sub-frame basis where a total amount of activity indicated by the sub-frame is below some predetermined minimum threshold level.

Figure 4A:
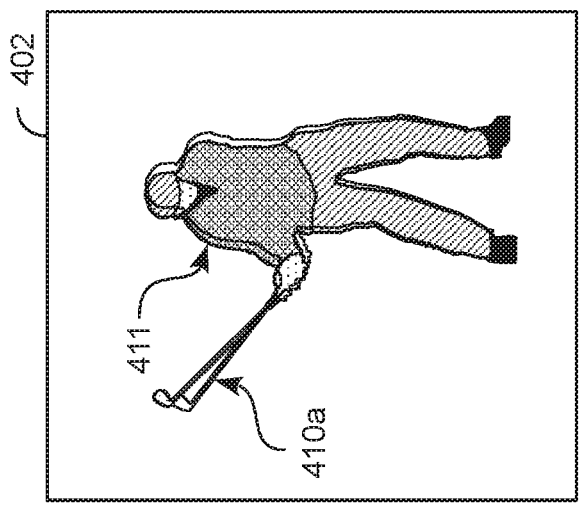
FIGS. 4A, 4B show examples of video data which is prepared for use in action recognition processes with a spiking neural network according to an embodiment.
Figure 4A:
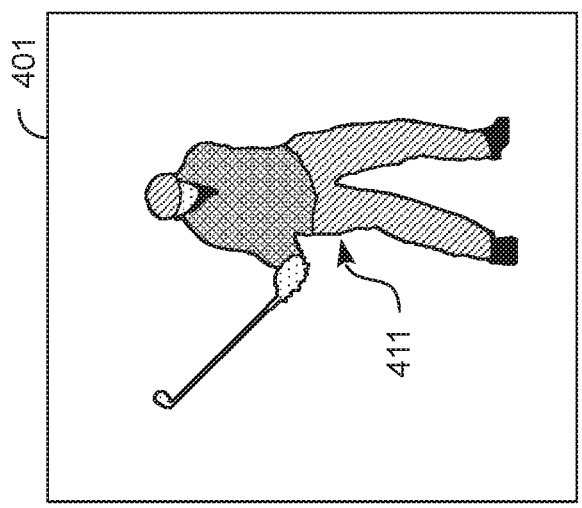
Figure 4A:
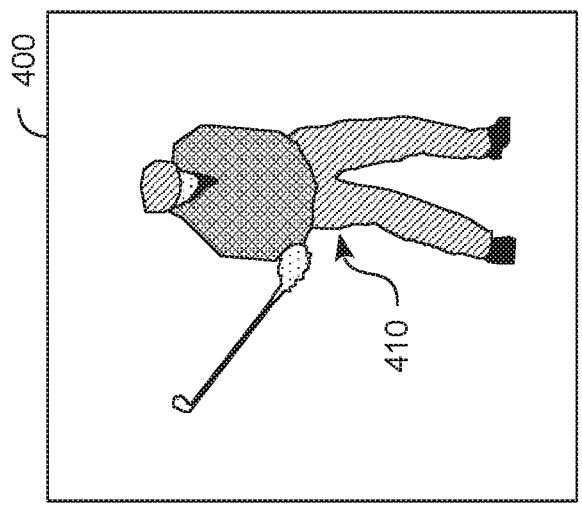
Figure 4B:
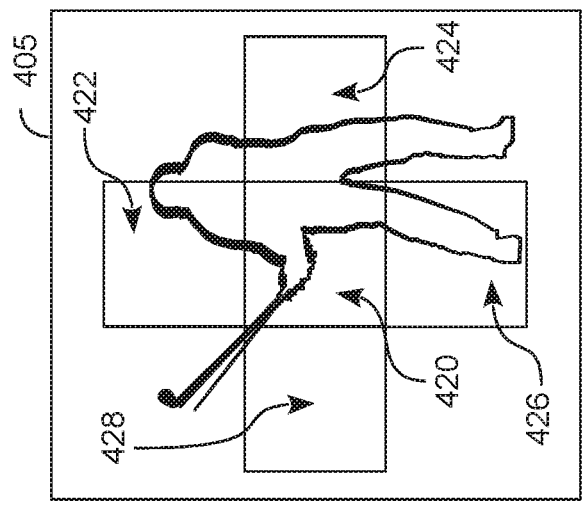
Figure 4B:
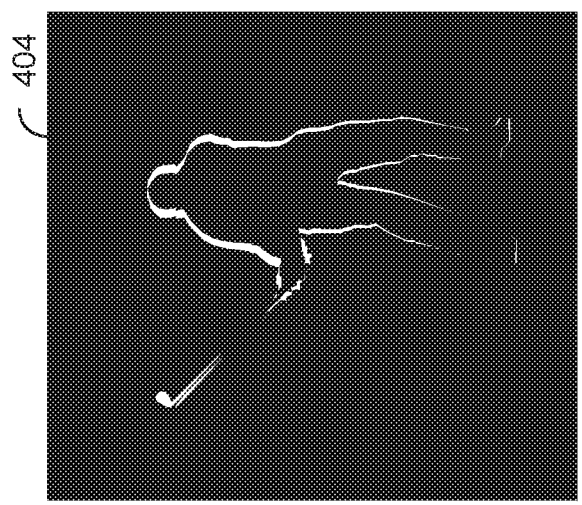
Figure 4B:
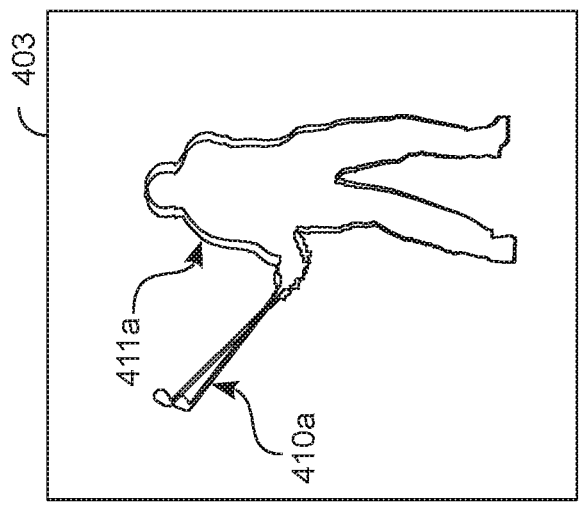

Embodiments described herein variously implement a processing of video information (e.g., including video differential data and, in some embodiments, raw video data on which such video differential data may be based) to detect for time-based indicia of a given action type. FIGS. 4A-4B show example frames 400-405 of image information which illustrate features of processing to generate differential video data. In various embodiments, an encoded version of such differential video data may be communicated, as one or more spike trains, to facilitate action recognition with a spiking neural network. Video information such as that variously represented by one or more of frames 400-405 may be communicated in system 200, for example, and/or may be processed with a spiking neural network according to method 300.

Frames 400-405 variously illustrate a video sequence—such as that of prerecorded and/or streaming video—which includes a representation of a given action (such as the golf swing activity shown). Frames 400, 401, which are different respective raw video frames of the video sequence, include representations of respective positions 410, 411 by a golfer who is performing an instance of a golf swing action type/class. The difference between positions 410, 411 may be somewhat small—e.g., wherein frame 400 precedes frame 401 in the video frame sequence immediately, or by only a few frames. FIGS. 4A, 4B also include frames 402, 403 to more clearly show this difference between positions 410, 411. For example, frame 402 shows an outline 410a of the representation of position 410, where the outline 410a is superimposed on the representation of position 411. Frame 403 shows outline 410a superimposed on an outline 411a of the representation of position 411. Frames 402, 403 are shown merely for illustrative purposes, and one or both of frames 402, 403 may not actually be generated during processing to determine differential video data such as that of frames 404, 405.

Some embodiments variously use differential video data whereby moving edge artefacts in a video sequence are given more relevance than relatively slow or even static portions of an imaged environment. For example, frame 404 is a frame of differential video data which is calculated based on a difference between frames 401, 402. For a given pixel of frame 404, a value of that pixel may be based on a difference between two corresponding pixels of frames 401, 402. In one example embodiment, a pixel of frame 404 may be white if such a difference is above some minimum threshold amount—e.g., wherein the pixel is otherwise to be black. Frame 405 shows another version of such differential video data according to some embodiments—e.g., wherein frame 405 is a photonegative of frame 404.

As variously shown in frames 404, 405, differential video data provides a filtering effect which effectively removes or otherwise mitigates the representation of static or relatively slow-moving portions of imaged objects. In some embodiments, respective values for pixels of frame 404 (or of frame 405) may be variously weighted—e.g., based on a magnitude of such a difference, based on the value of adjoining pixels and/or the like.

In some embodiments, sub-frame portions of a given differential video frame may be selectively given more or less weight, or may be selectively prevented from representation by spike train signals which are to be communicated to a spiking neural network. By way of illustration and not limitation, video data processor logic 202 (or other such hardware and/or executing software) may define sub-frame portions 420, 422, 424, 426, 428 of frame 405. The particular number, sizes, shapes, and relative configuration of sub-frame portions 420, 422, 424, 426, 428 is merely illustrative, and may vary in other embodiments. In such an embodiment, whether and/or how a given one of sub-frame portions 420, 422, 424, 426, 428 is to be subsequently encoded and/or otherwise processed may be determined based on the pixel information of that sub-frame portion. For example, as described herein, the inclusion of a given sub-frame portion may depend on whether the pixels of that sub-frame portion represent some minimum threshold level of motion energy.

Pixels, representing differential motion information across different times, may be tracked so that a basic action signature is captured. For example, this may be done by monitoring a difference of pixel intensity values ($P_{diff}$) between consecutive frames of raw video data, and comparing the difference against some threshold ($\epsilon$, that is user-defined) to detect the moving edges (for each location (x, y) within a frame)—e.g., according to the following:

$$P_{diff}(x, y) = Frame_j - Frame_{j-1}; \quad (2)$$

(where $j = 2$ to $NumberofFrames$), $$\text{If } P_{diff}(x, y) \geq \epsilon, Spike_{diff}(x, y) = 1, \text{ and} \quad (3)$$

$$WSpike_{diff}(x, y) = \frac{\sum_i \epsilon_i Spike_{diff}(x, y)}{\sum_i \epsilon_i}; \text{ where } i = 1 \text{ to } N \quad (4)$$

Such threshold-based processing may detect pixels representing moving edges, enabling the generation of an equivalent spike pattern ($Spike_{diff}$) for each frame of differential video data. The representation of such moving edges as input spiked signaling may preserve a temporal correlation across different frames. While $Spike_{diff}$ may encode a signature of an action adequately, the representation may be made more robust, in some embodiments, by varying the threshold (e.g., $\epsilon_i=\{2, 4, 8, 16, 32\}$ and N=6) and computing the weighted summation of the spike differences for each threshold—e.g., as shown in Equation (4). In such an embodiment, a resulting weighted spike difference $WSpike_{diff}(x, y)$ may then be converted into a binary signal to yield the respective spike patterns for each frame of differential video data.

Accordingly, frame 404 (or alternatively, frame 405) may be a frame-based representation of spike train inputs which are based on a detection of movement that is represented by differential pixel values of frames 400, 401. Frames 404, 405 of differential video data may be generated, for example, based on a fixed threshold level for a spike input. In some embodiments, generation of some or all such frames may be additionally or alternatively based on a varying threshold level which, for example, selectively weights signal input for various frames (or sub-frame portions thereof). Such a weighted input may improve the detection of edge artifacts and/or other subtler movements which are indicia of a particular action. Due at least to the possibility of imaging noise and/or one or more other actions being represented in any one video sequence, there may exist a considerable risk of error in class recognition processes. Hence, a detailed input pattern that captures more subtle gestures may facilitate a spiking neural network in differentiating the signature motion from noise and/or other imaged activity. In some embodiments, ROB pixel video data may be converted into grayscale before performing motion detection. In other embodiments, motion detection may be performed using differential video data which represents pixel information with respect to a polychromatic color space.

At least some background activity may also be captured in differential video data (and, in some embodiments, in raw video data on which the differential video data is based). Such background spiking may occur, for example, due to camera movement or jitter. However, in some scenarios, a majority of the pixels of a given frame of differential video data may indicate little or no activity (e.g., as in the case of the black pixels shown in frame 404). To avoid the wasteful computation due to non-spiking pixels (and/or to otherwise circumvent insignificant activity due, for example, to camera motion), at least one sub-frame portion (also referred to herein as a "bounding box" or "BB") may be defined each for a respective region of a differential video data frame. For example, at least one respective BB may be located each around a Centre of Gravity (CoG) of spiking activity for a corresponding frame. In one example embodiment, various scans may be performed each in a respective one of five BBs of a frame—e.g., such as the center, top, right, bottom and left BBs shown for respective sub-frame portions 420, 422, 424, 426, 428.

A CoG ($x_g$, $y_g$) may be calculated, for example, as the average of the active pixel locations within the BB. In one example, the pixel dimensionality of a video frame is approximately 200 pixels×300 pixels (e.g., ±10% along either axis). An example embodiment may define one BB which is centered at the CoG—e.g., the BB having a pixel size 41×41—and perform a Center (C) scan to capture the spiking activity enclosed within that center BB. Additional scanning may variously stride the centered BB along different directions—e.g., by a number of pixels which is approximately equal to half the distance between the CoG and the edge of the BB—and perform Left (L), Right (R), Top (T) and Bottom (B) scans to variously capture the activity in the corresponding directions. These five BB may function as different windows each for a distinct spiking activity filter scan process.

In some embodiments, a first filter scan process may be performed for a center BB of a given frame of differential video data. Then, filter scanning may be shifted from the center of the image to the CoG of spiking activity—e.g., based on a result of the first filter scan process. Other filter scan processes may occur in four corresponding directions (e.g., top, bottom, left and right) with respect to CoG of the image by the stride amount. The center/right/left/top/bottom (CRLTB) scans may only retain one or more particularly relevant regions of interest across different frames of a video sequence—e.g., while filtering out at least some other relatively less relevant spiking activity. Different scans may capture diverse aspects of a relevant spiking activity and, as a result, most or all of the significant movements for a particular action in a given frame may be acquired in a holistic manner.

In addition to or instead of such scan based filtering, one or more frames may be deleted based, for example, on the effect of jitter or camera movement on the spike input data. For example, frames may be selectively deleted based on one or each of various conditions. For example, if the overall number of active pixels for a given spiking frame are greater/lesser than a certain maximum/minimum threshold, then that frame may be deleted. This may eliminate some or all of the differential video data frames that have flashing activity due to unsteady camera movement. One example embodiment uses min/max threshold values of 8%/75% of the total number of pixels in a given frame. However, these threshold values are merely illustrative and may vary according to implementation-specific details, the action to be recognized, and/or the like. Such frame deletion may be performed before CRLTB scans are obtained. Alternatively or in addition, once the CRLTB scans are obtained, a level of motion energy—that is, a level of pixel activity/change—may be monitored for a given sub-frame in one of RLTB as compared to C (i.e., for $Frame_i$ check $C_i - \{R_i, L_i, T_i, B_i\}$). If the activity change (say, $C_i - R_i$) is greater than the mean activity across $C_i$, then, that particular sub-frame ($R_i$) corresponding to the scan that yields high variance may be deleted.

The above methods of filtering may mitigate the effects of ambiguous motion or noise in videos, or may to a large extent reduce the processing load for video information with minimal background activity or jitter motion. However, where a video also represents significant background motion, interaction between multiple human subjects, etc., the extracted spike pattern may not encode a robust and reliable signature motion due to extreme variation in movement. Nonetheless, the input processing methods of some embodiments variously yield reasonable recognition accuracy—e.g., when used in combination with a D/A model architecture for configuring action recognition.

Some embodiments, prior to action detection based on a given sequence of differential video data, train a spiking neural network to recognize an action type based on input signaling which represents reference differential video data. Such training may take place after the neural network is configured according to a type of modelling which, for brevity, is referred to herein as a "Driven/Autonomous" (or "D/A") reservoir model.

Figure 5:
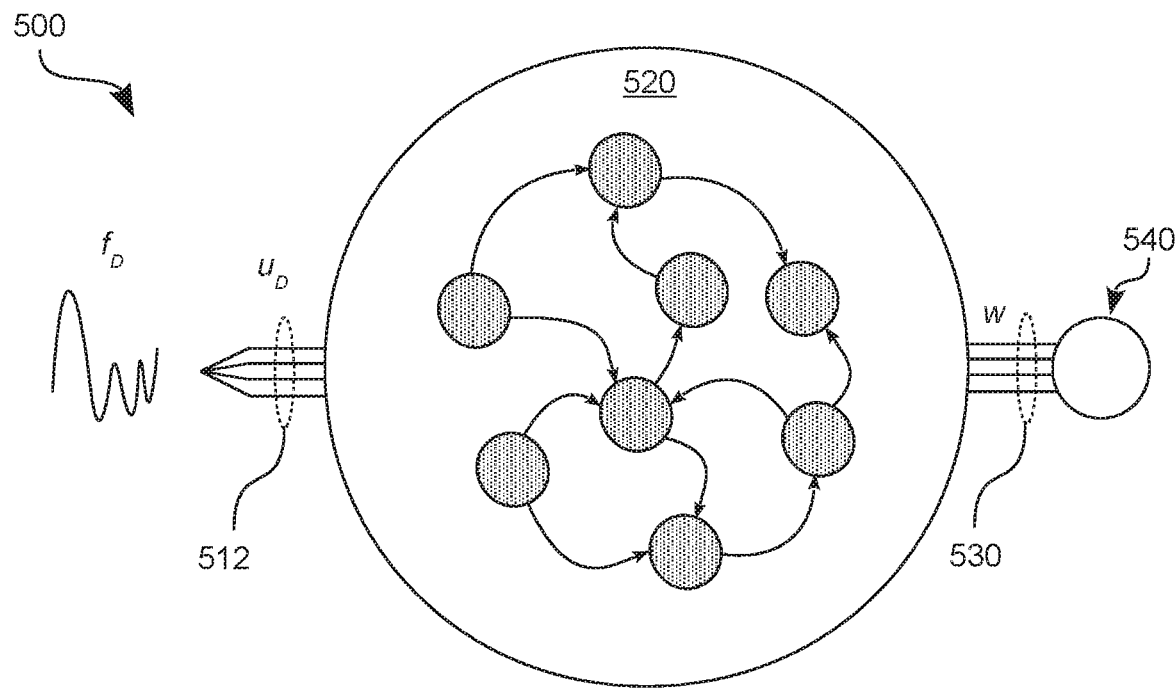
FIG. 5 shows functional block diagrams illustrating respective stages of processing to configure a spiking network according to an embodiment.
Figure 5:
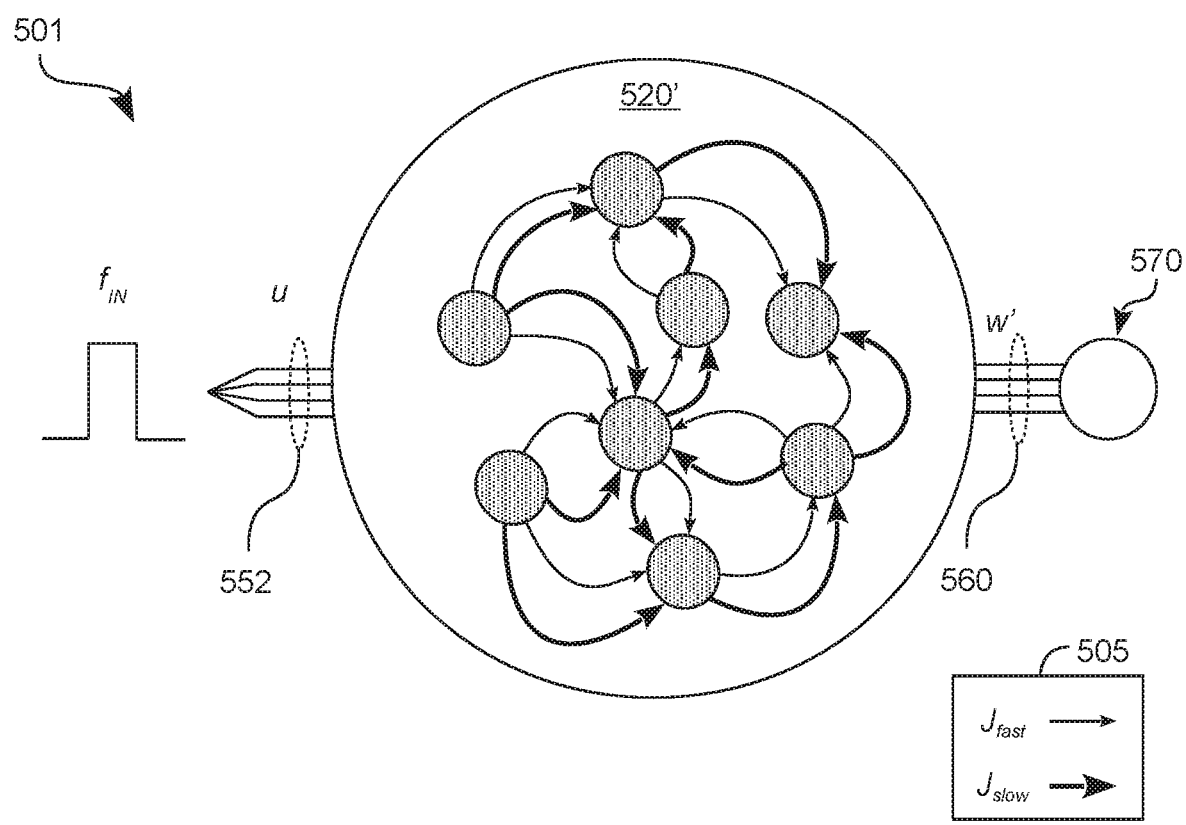

Stages 500, 501 of an example Driven/Autonomous reservoir modeling process is illustrated in FIG. 5. As shown, a driven model 520 at stage 500 and an auto model 520' at stage 501 may, for example, each be 3-layered networks. However, any of a variety of larger, smaller or differently configured networks may be implemented with a D/A model, in other embodiments. An input layer of the network may be connected to a reservoir that comprises, for example, nonlinear (e.g., leaky Integrate-and-Fire, or "LIF") spiking neurons recurrently connected to each other in a random sparse manner. Neurons (or "nodes") of the network may have a connection probability of 10%, in one illustrative example. A spiking output produced by the reservoir may then be projected to one or more output readout neurons. In the example embodiment shown, driven model 520 is coupled via output synapses 530 to a readout node 540—e.g., where auto model 520' is coupled via output synapses 560 to a readout node 570.

In the case of driven model 520, output neurons may include rate neurons that, for example, simply integrate die spiking activity of the reservoir neurons. By contrast, auto model 520' may be an entirely spiking model with LW neurons at the output as well as within the reservoir. Reservoir neurons/nodes may each be excitatory in nature—e.g., where the reservoir does not provide any inhibitory neuronal dynamics such as that of conventional Liquid or Reservoir Computing. In such an embodiment, driven model 520 may be providing targets ($f_{out}$) for auto model 520' to be implemented by a spiking network configured for a given task. To achieve this, driven model 520 may be trained on an input ($f_D$), provided via input synapses 512, that is a high pass filtered version of the desired output ($f_{out}$):

$$f_D = f_{out} + \tau_{fast}\frac{df_{out}}{dt} \quad (5)$$

The connections from the reservoir to the readout neurons (w) of driven model 520 may then be trained to produce desired activity using a Recursive Least Square (RLS) rule. Once trained, connections $J_{fast}$ of driven model 520 (see legend 505) may be imported into autonomous model 520' and a new set of network connections ($J_{slow}$) may be added for each fast connection.

The combination of the two sets of synapses, $j_{fast}$ and $J_{slow}$, may allow auto model 520' to match its internal dynamics to that of the driven model 520 that is already tuned to produce a desired $f_{out}$. Various weights of connections u and/or $J_{slow}$ in auto model 520' may be derived from driven model 520—e.g., where $u=u_D \cdot u_R$ and $J=u_D \cdot B_w$, and $u_R$ and B are randomly chosen. The time constants of the two sets of synapses may be different i.e., where a $\tau_{slow} \sim 10 \ast \tau_{fast}$ allows the auto model 520' to slowly adjust its activity to produce Pout during training.

After autonomous model 520' is constructed, synapses w' from its output layer (e.g., comprising LIF spiking neurons) may be trained based on the input $f_{in}$ provided via input synapses 552—e.g., the training based on a supervised Spike Timing Dependent Plasticity (STDP) rule. Using $f_D$ as a filtered version of $f_{out}$ may compensate for a synaptic filtering at the output characterized by time constant, $\tau_{fast}$. However, the dependence of $f_D$ on $f_{out}$ from Equation (5) may result in a requirement that the number of input neurons and the number of output neurons be the same for the reservoir. To address this limitation and extend the D/A construction approach to variable input-output reservoir models, some embodiments variously implement, or may be otherwise based on, a delay apportioning method—e.g., wherein the driven input may be approximated as:

$$(f_{D_i})_j = (f_{out})_j + \tau_{fast_i}\frac{(df_{out})_i}{dt} \quad (6)$$

Here, i may vary from 1 to X, j may vary from 1 to Y, where X/Y are the number of input/output neurons in the reservoir model respectively, and:

$$\tau_{fast} = \sum_{i=1}^{X} \tau_{fast_i} \quad (7)$$

For each output function (($f_{out})_j$), the driven inputs ($f_{Di=1} \ldots x)_j$ may be derived by distributing the time constant across different inputs. In such an embodiment, phase delay may be compensated due to $\tau_{fast}$ in an approximate manner. Nevertheless, this approximate version of $f_D$ may still drive driven model 520 to produce the desired output and derive a connection matrix of autonomous model 520' that may then be trained based on a real input (e.g., representing reference video information).

In the case of driven model 520, input spiking activity for a particular input neuron fix, even with $\tau$ fast apportioning, may approximate a target quite well. Also, the autonomous model 520' derived from driven model 520 produce desired spiking activity in response to random input, upon adequate training of the w' connections. In one example embodiment, the dynamics of reservoir neurons in a Driven/Autonomous model may be described by the following:

$$\tau_{mem}\frac{dV}{dt} = V_{rest} - V + (J_{fast}f(t) + u_D f_D); \text{Driven}, \quad (8)$$

and $$\tau_{mem}\frac{dV}{dt} = V_{rest} - V + (J_{fast}f(t) + J_{slow}s(t) + u_D f_{in}); \text{Auto} \quad (9)$$

where $\tau_{mem}=20$ milliseconds (ms), $f_{in}$ denotes real input spike data, $f_D$ is a derived version of the target output (refer to Equation 6), unlit are the weights connecting the signal input to the reservoir neurons in the driven model 520 and auto model 520', respectively. In one example of such a network, neurons may variously fire each when its respective membrane potential, V, reaches a threshold $V_{th}=-50$ milliVolts (mV) and is then reset to $V_{reset}=V_{rest}=-70$ mV.

Following a spike event, a neuron's membrane potential may be held at the reset value $V_{reset}$—e.g., for a refractory period of 5 ms. The parameters f(t), s(t) correspond to fast/slow synaptic currents that may be observed in the reservoir due to the inherent recurrent activity. In driven model 520, only fast synaptic connections may be present, whereas auto model 520' may have both slow connections and fast connections. The synaptic currents may be encoded as traces—e.g., wherein, when a neuron in the reservoir spikes, f(t) (and s(t) in case of auto model 520') may be increased by 1, otherwise it may decay exponentially as:

$$\tau_{slow}\frac{ds(t)}{dt} = -s(t), \quad (10)$$

and $$\tau_{fast}\frac{df(t)}{dt} = -f(t) \quad (11)$$

where $\tau_{slow}=100$ ms, $\tau_{fast}=5$ ms. Both $J_{slow}$ and $J_{fast}$ recurrent connections within the reservoir of D/A model may be fixed during the course of training. $J_{fast}$ of the driven model 520 may, for example, be randomly drawn from a normal distribution. $J_{slow}$ and u of auto model 520' may be derived from driven model 520 using $u_R=1$, where B is a random number drawn front a uniform distribution in the range [0, 0.15]. If the reservoir outputs a spike pattern, say x(t), the weights from the reservoir to the readout (w) may be trained to produce the desired activity, $f_{out}$. The continuous rate output neurons in driven model 520 may be trained—e.g., using a RLS process—such that $w \ast x(t) \sim f_{out}(t)$. The spiking output neurons of auto model 520' (with neuronal parameters similar to those of Equation 9) may integrate the net current $w' \ast x(t)$ to fire action potentials that converge toward the desired spiking activity with supervised STDP learning. The example values for parameters of the equations shown herein are merely illustrative, and may vary in different embodiments according to implementation specific details.

A reservoir framework according to an embodiment may relax the burden of training by an efficient fixing of connectivity within the reservoir and of connectivity with an input to the reservoir. Merely an output layer of readout nodes (w, w' in FIG. 5) may be trained—e.g., at least generally in a supervised manner to match the reservoir activity with the target pattern. In a D/A based reservoir construction of some embodiments, readout of the driven network may be trained using standard RLS learning, where a modified version of a supervised STDP rule may be used to conduct autonomous model training. One example of an STDP rule-based training used in some embodiments is shown in FIG. 6.

Figure 6:
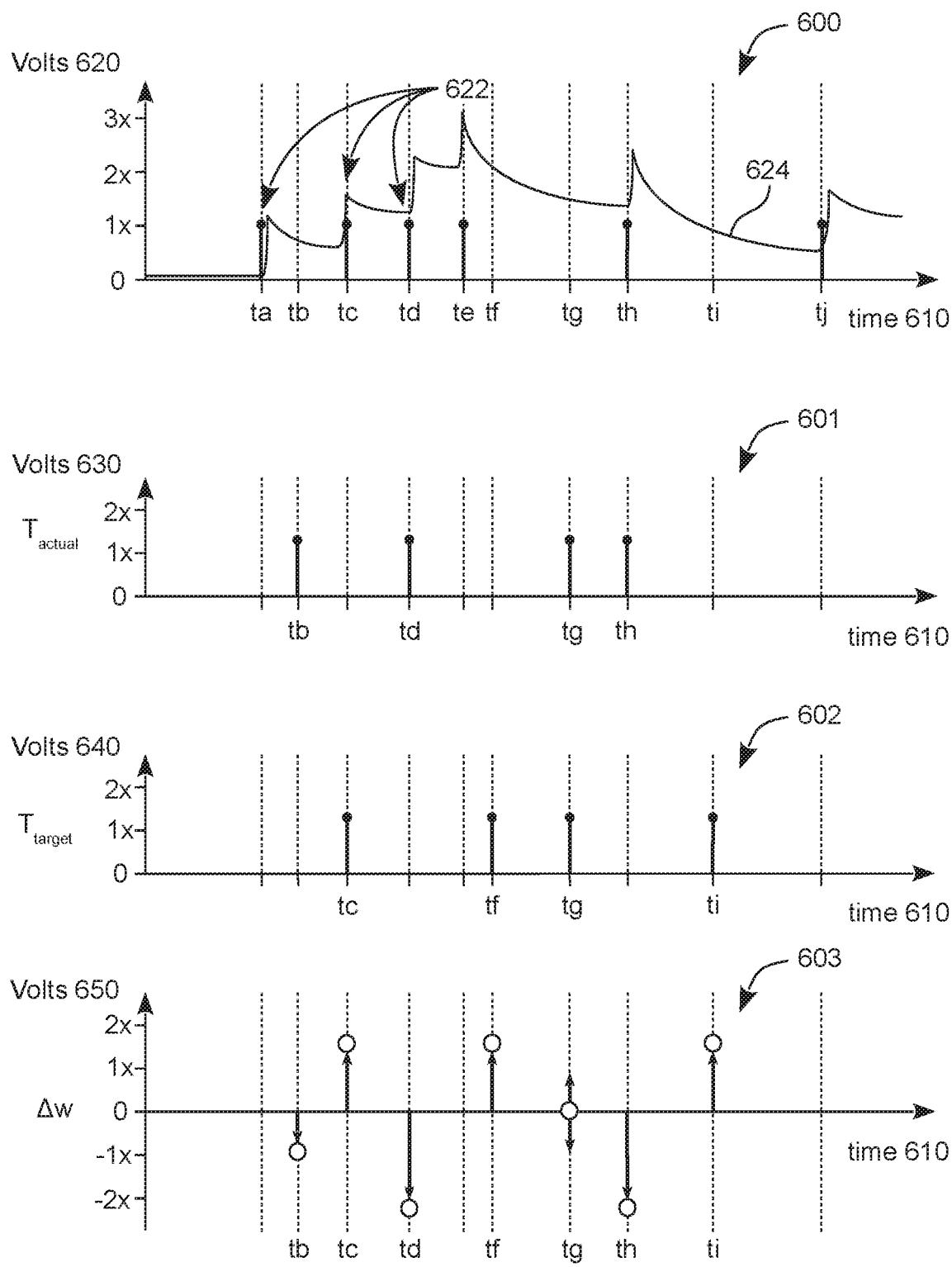
FIG. 6 shows timing diagrams illustrating respective signals communicated to determine a value of a synaptic weight according to an embodiment.

FIG. 6 shows graphs 600-603 variously showing signals provided by a spiking neural network during an action recognition process according to an embodiment. Graphs 600-603 variously show these signals with respect to a common period of time—including times ta-tj—on a time axis 610. Signals such as those variously represented in graphs 600-603 may be determined with one of spiking neural networks 100, 230—e.g., wherein the neural network is generated based on data model 520 and autonomous model 520'. Some or all such signals may be generated by operations of method 300, for example.

Graph 600 shows, in Volts 620 (or other such units of potential), various spikes 622 of a signal $T_{pre}$, that is provided to a given readout node of the spiking neural network—e.g., the spikes 622 from another node during the action recognition process. In the example scenario shown, spikes 622 are variously received by the readout node at respective times ta, tc, td, th, tj. Graph 600 also shows a plot 624 of a trace (e.g., a membrane potential) for the readout node, where various spikes of $X_{trace}$—each in response to a respective one of spikes 622—are each followed by a decaying of $X_{trace}$ until some next one of spikes 622 is received.

Graph 601 represents, in Volts 630, spikes (at respective times tb, td, tg, th) of a signal $T_{actual}$ which is output from readout node associated with trace $X_{trace}$. Signal $T_{actual}$ may be based on $X_{trace}$ and, in some embodiments, one or more other spike trains (not shown) that are concurrently provided to the readout node. Graph 602 represents, in Volts 640, spikes (at respective times tc, tf, tg, ti) of a target signal $T_{target}$ representing the desired spiking activity by the readout node.

Graph 603 represents, in Volts 650, values of a change Δw to be variously applied (each at one of times tb, tc, td, tf, tg, th, ti) to a value of synaptic weight w. More particularly, graph 603 shows both circles representing respective values of Δw and, for each such circle, one or more vectors illustrating how the corresponding values of Δw is determined. For a given target pattern, the synaptic weights of the spiked neural network may be selectively potentiated or depressed according to the following:

$$\Delta w = X_{trace}(T_{target} - T_{actual})$$

where $T_{actual}$ and $T_{Target}$ denote the time of occurrence of actual and desired (respectively) spiking activity at the post-synaptic neuron during the simulation, and where pre-synaptic trace $X_{trace}$ models the pre-neuronal spiking history. Every time a pre-synaptic neuron fires, $X_{trace}$ may increase by 1, otherwise it may decay exponentially with $\tau_{pre}$ that, for example, is of the same order as $\tau_{fast}$. As illustrated in FIG. 6, Equation 12 may variously depress (or potentiate) weights at times when actual (or target) spike activity occurs. This may promote convergence of the actual spiking toward a desired network activity as training progresses. Once the desired/actual activity become similar, the learning may stop, since at time instants where both desired and actual spike occur nearly simultaneously, the weight update value as per Equation 12 may become 0 or otherwise negligibly small.

To train a spiking model for action recognition, some embodiments model a desired spiking activity at the output layer based on one-shot encoding. For example, an output neuron to be associated with a particular action type/class may be trained to produce high spiking activity while one or more other output neurons are trained to concurrently exhibit minimal (e.g., zero) signal spiking activity. A supervised STDP rule (as described herein) may be used to train the output layer of the autonomous model. Since the desired spiking activity of the auto model (e.g., $f_{out}$) may be based on such one-shot spike encoding, the driven network (from which the auto model may be derived) may be constructed to produce equivalent target output activity. Accordingly, the auto model as a whole may operate on differential video data for neural network training or to perform required tasks such as classification. The connection matrix ($J_{slow}$) of the auto model may be derived from a driven network (with continuous rate-based output neurons) that, in turn, may provide the target activity for the output neurons of the auto model.

Figure 7:
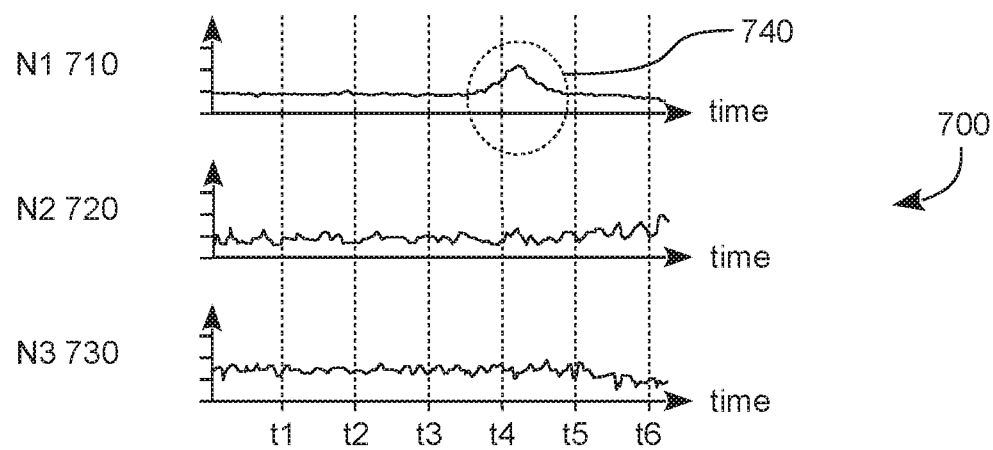
FIG. 7 shows timing diagrams variously showing respective outputs of a spiking neural network each for a corresponding action recognition process according to an embodiment.
Figure 7:
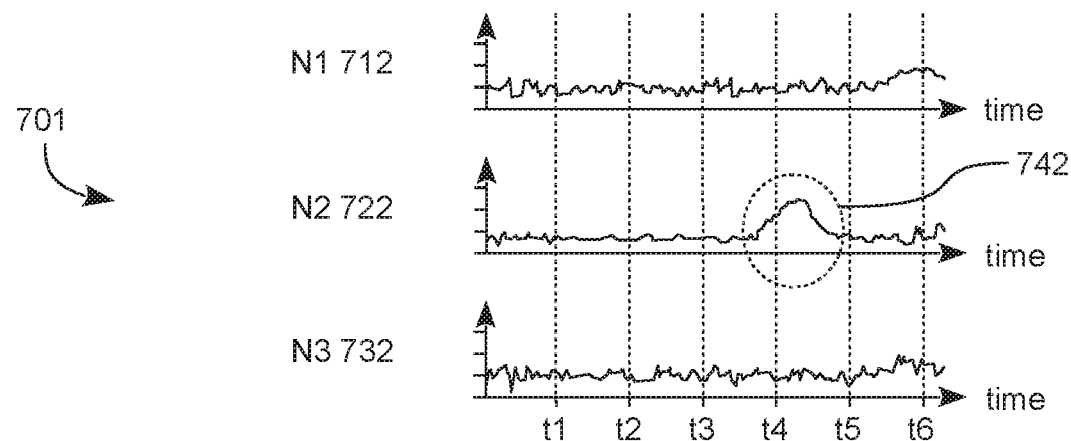
Figure 7:
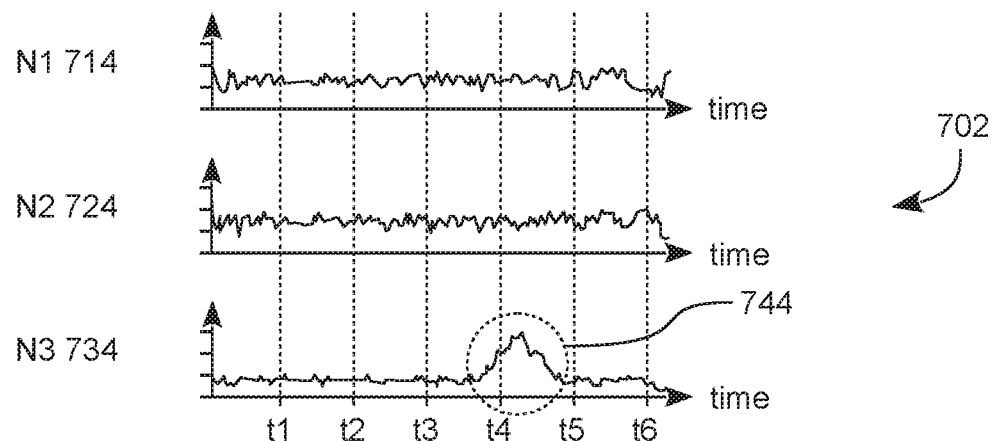

FIG. 7 illustrates an example of various output signals based on one-shot spike encoding processes according to an embodiment. Such one-shot spike encoding processes may train output nodes of a spiking neural network variously indicate different respective one of multiple (e.g., three) action types. As shown, a reservoir may, for example, be trained to provide a readout with three output neurons, where (based on at least three one-shot training processes) various output spiking 'bumps' by the output neurons variously indicate the activities.

FIG. 7 shows a set 700 of three graphs 710, 720, 730 representing signaling by respective output nodes N1, N2, N3 of a spiking neural network which is trained to recognize any of three different action types. More particularly, graphs 710, 720, 730 represent concurrent outputs by nodes N1, N2, N3 during processing which detects that some first differential video data represents an activity of a first action type which, for example, is associated with node N1. Detection of the first action type may be based on a peak 740 of the output in graph 710—e.g., where peak 740 occurs while graphs 720, 730 are relatively quiescent.

FIG. 7 also shows a set 701 of graphs 712, 722, 732 representing signaling by output nodes N1, N2, N3 during alternative processing which instead detects that some second differential video data represents an activity of a second action type. The second action type may be associated with node N2—e.g., wherein detection of the second action type is based on a peak 742 of graph 722 which occurs while graphs 712, 732 are relatively quiescent. Furthermore, FIG. 7 also shows another set 702 of graphs 714, 724, 734 representing signaling by output nodes N1, N2, N3 during processing which detects that some third differential video data represents an activity of a third action type. The third action type may be associated with node N3—e.g., wherein detection of the third action type is based on a peak 744 of graph 732 which occurs while graphs 714, 724 are relatively quiescent.

Figure 8:
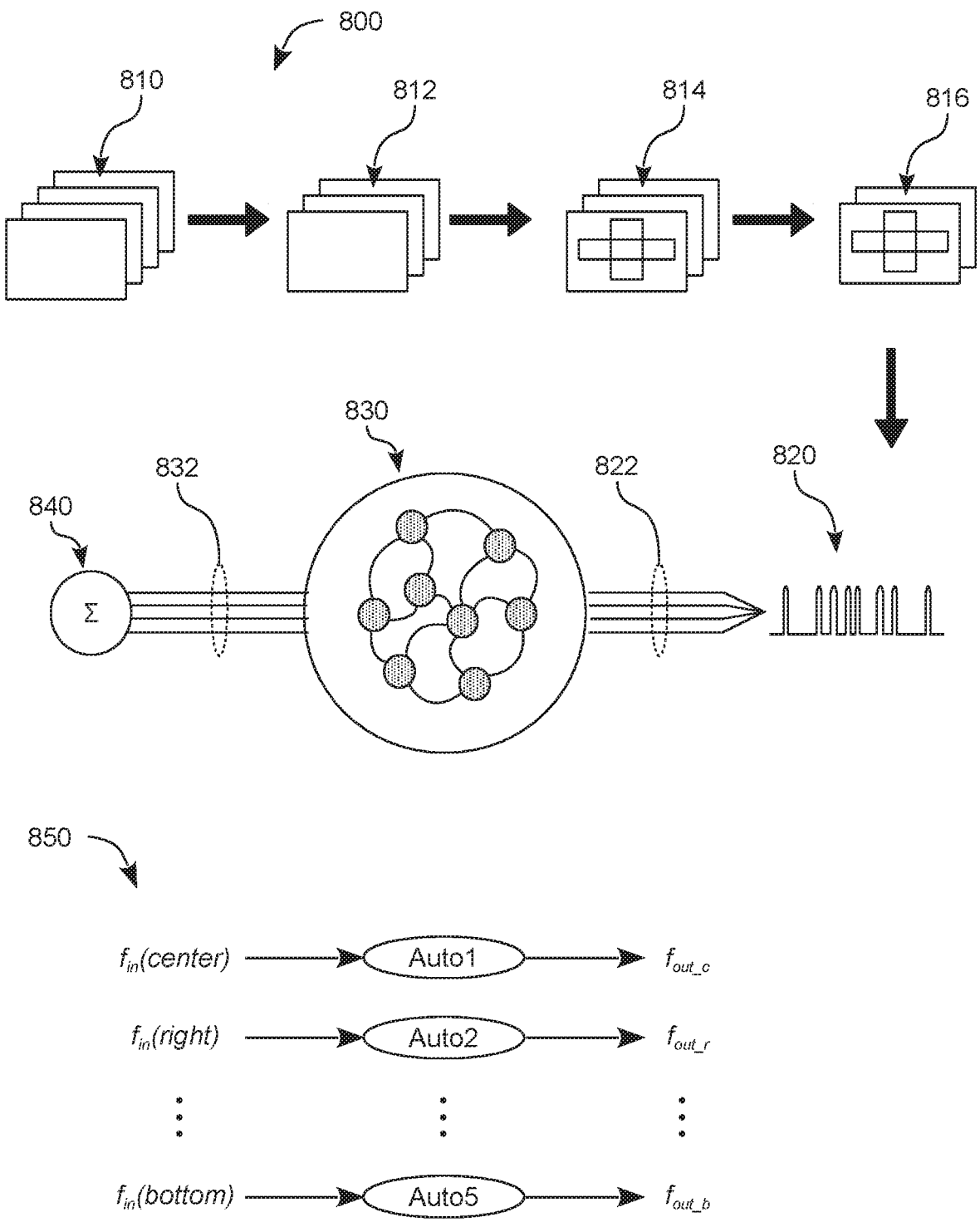
FIG. 8 is a functional block diagram illustrating features of a system to provide action recognition functionality according to an embodiment.

FIG. 8 shows a functional block diagram illustrating processing by a system 800 which perform action recognition based on differential video frames. In an embodiment, system 800 includes features of system 200—e.g., wherein input synapses 822, spiking neural network 830 and output synapses 832 of system 800 correspond functionally to input synapses 222, spiking neural network 230 and output synapses 232, respectively. For example, spiking neural network 830 may receive via input synapses 822 one or more input spike trains 820 which represent an encoding of frames of differential video data. Generation of the one or more input spike trains 820 may include or otherwise be based on determining frames 812 of differential video data each based on a corresponding two of raw video data frames 810.

Although some embodiments are not limited in this regard, system 800 may perform one or more operations whereby pixel values of frames 812 are selectively excluded (or included), weighted and/or otherwise changed as part of encoding to generate the one or more input spike trains 820. By way of illustration and not limitation, processing of frames 812 may result in processed frames 814 for which bounding boxes are variously defined. As used herein, "hounding box" refers to only a subset of all pixels in a frame—e.g., where the subset is to be evaluated independently of any similar evaluation of another portion of that same frame. In the example embodiment shown, center, right, left, top and bottom bounding boxes have been identified for each of frames 814, the five bounding boxes arranged in a cruciform configuration. More, fewer and/or differently configured arrangements of bounding boxes may be defined for a frame, in other embodiments.

Evaluation of frames 812, or of frames 814, may result in pixel values from frames 812 being variously weighted and/or selectively included in (or excluded from) an encoding process to generate the one or more signals 820. For example, pixel values may be selectively excluded from encoding based on a comparison to a threshold pixel level associated with insufficient (or alternatively, excessive) motion energy in a video sequence. In the embodiment shown, frames 816 (selected to be included in encoding to generate the one or more signals 820) are only a subset of frames 814—e.g., wherein others of frames 814 are above a maximum threshold, or below a minimum threshold, for some or all pixel values. The one or more signals 820 may represent a reference video sequence for training the spiking neural network 830 to recognize an activity which the video sequence represents. Alternatively, one or more signals 820 may represent an imaged action that is to be classified based on such training of spiking neural network 830. For example, evaluation circuitry 570 (e.g., providing functionality of selector logic 240) may identify an activity type based on signaling which is received via some or all of output synapses 832.

In one example embodiment, action recognition based on differential video data includes a spiking neural network receiving input spiked signaling that, for example, includes different scan spike patterns (e.g., one for each of five CRLTB sub-frame portions) per differential video data frame. With D/A based reservoir construction, five respective scans for each differential video data frame may be processed—e.g., by five different respective autonomous models.

For example, FIG. 8 also shows a set 850 neural network paths which for example, include or are part of spiking neural network 830. As shown in FIG. 8, each scan may be processed separately by a corresponding one of multiple autonomous models (such as the illustrative models Auto1, Auto2, . . . , Auto5 shown). Where the internal topology across all auto models is equivalent, they may all be derived from a single driven model. One other advantage is that there may be no limit to the number of autonomous models that may be extracted from a given driven network. Thus, in case more scans based on depth filtering or motion monitoring are to be obtained based on input processing, the same driven model may be easily extended to incorporate more autonomous models corresponding to these other scan types.

During training, the driven network may be first trained to produce the target pattern (similar to the one-shot spike encoding described in reference to FIG. 7). Then, each autonomous model may be trained separately on the corresponding input scan to produce the target pattern. Each auto model may be trained for 30 epochs, for example. In each training epoch, the training input patterns corresponding to all classes may be presented sequentially (for instance, Class 1→Class 2→Class 3) to produce target patterns. Each input pattern may be presented for a time period of 300 ms (or 300 time periods). In each time period, a particular spike frame for a given scan may be processed by the reservoir. For patterns where total number of frames is less than 300, the network may still continue to train (even in absence of input activity) on the inherent reservoir activity generated due to the recurrent dynamics. This may enable the reservoir to generalize its dynamical activity over similar input patterns belonging to the same class while discriminating patterns from other classes. Before presenting a new input pattern, the membrane potential of all neurons in the reservoir may be reset to their resting values.

After training is done, test instances $f_{in}$(center), $f_{in}$(right), . . . $f_{in}$(bottom) of CRLTB scans may be passed each to a respective one of the auto models Auto1, Auto2, . . . , Auto5 simultaneously, and the respective output activity $f_{out\_c}$, $f_{out\_r}$, . . . $f_{out\_b}$, observed. A given test instance may be assigned a particular class label based on the output neuron class that generated the highest spiking response. One such assignment may be done for each auto model. Subsequently, a majority vote may be taken across all the assignments (or all auto models) for each test input to predict its class. For instance, if a majority of the auto models (i.e., ≥3) predict a particular action class (say Class 1), then an activity class output from the model may be Class 1. Now, a single auto model may not have sufficient information to recognize a particular test input correctly. One or more others of the remaining scans or auto models, in that case, may compensate for the insufficient or inaccurate output classification from one individual models.

While the computational complexity of training may be reduced by using a scan based filtering approach that partitions the input space into smaller scans, the parallel processing and evaluation for action recognition/classification enhances the collective decision making of the architecture, thereby improving the overall performance. In one example embodiment, the reservoir (both driven/auto) topology in case of the video classification experiments consist of X(InputNeurons)-N(ReseryoirNeurons)-(OutputNeurons) with p % connectivity within the reservoir. X may be equivalent to the pixel size of the bounding box used during scan based filtering (e.g., X=41×41=1681). The number of output neurons may vary—e.g., based on the classification problem, that is, Y=5 for a 5-class problem. In one example embodiment, p=10% connectivity is used to maintain the sparseness in the reservoir. The number of neurons N may be varied based upon the complexity of the problem in order to achieve sufficiently reliable classification accuracy.

In some embodiments, a plurality of spiking neural networks (e.g., arranged in a parallel configuration such as that of Auto1, Auto2, . . . , Auto5) may be trained each to recognize a different respective activity type. The training plurality of spiking neural networks may include some first spiking neural network which is trained to recognize a particular first activity type. After such training of the plurality of spiking neural networks, a comparison may be made of multiple output signals which are each from a different respective one of the plurality of spiking neural networks—e.g., where the output signals are each based on the same given test video sequence. Based on the comparing, hardware and/or executing software (such as that of selector logic 240, for example) may select among from the multiple output signals a first output signal which is provided by the first spiking neural network. Based on the selecting of the first output signal, signaling may be generated to communicate that the test video sequence includes a representation of an instance of the first activity type. In such an embodiment, comparing the multiple output signals may comprise comparing a measure of output signal spiking from each of the plurality of trained spiking neural networks.

Figure 9:
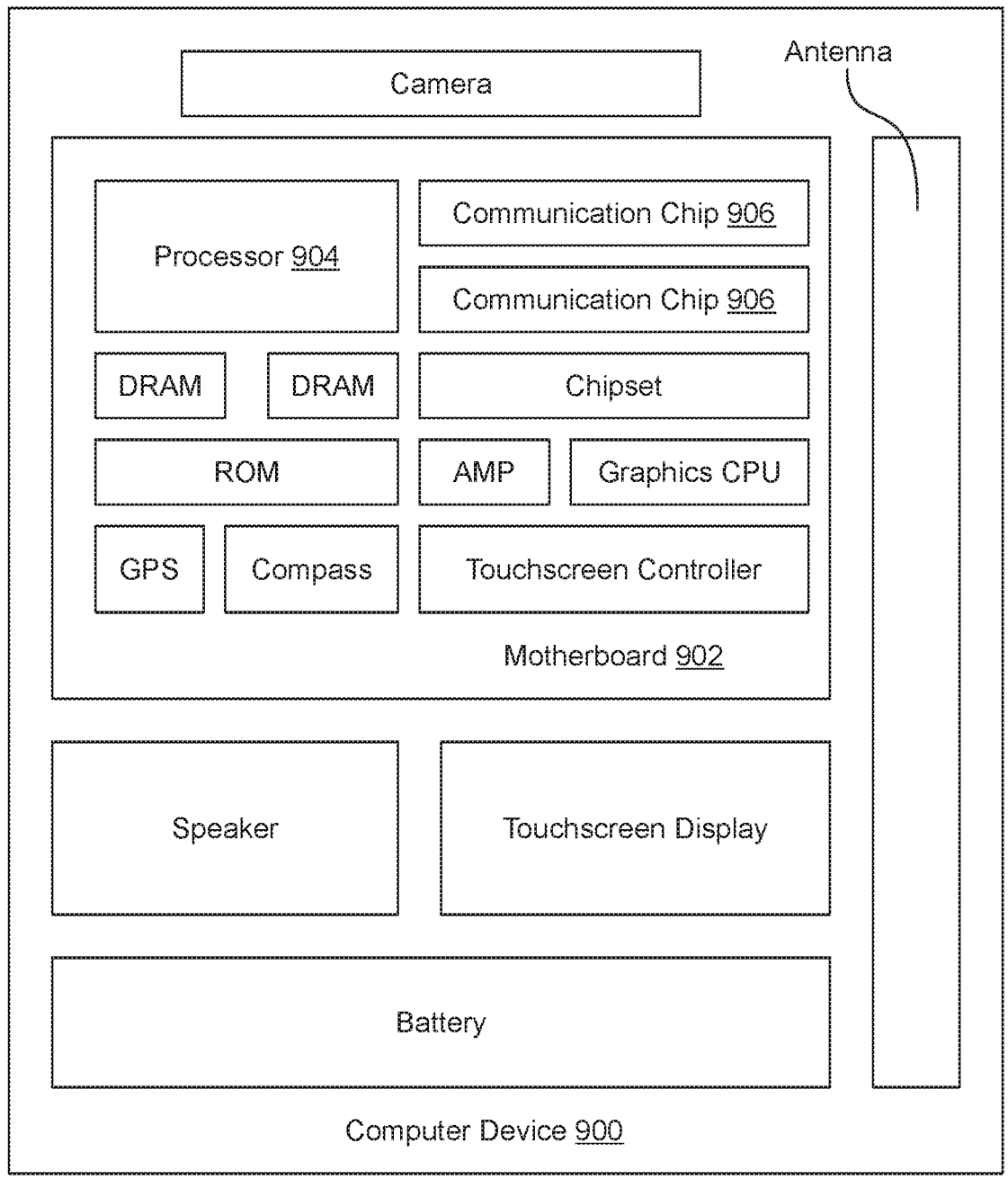
FIG. 9 is a functional block diagram illustrating a computing device in accordance with one embodiment.

FIG. 9 illustrates a computing device 900 in accordance with one embodiment. The computing device 900 houses a board 902. The board 902 may include a number of components, including but not limited to a processor 904 and at least one communication chip 906. The processor 904 is physically and electrically coupled to the board 902. In some implementations the at least one communication chip 906 is also physically and electrically coupled to the board 902. In further implementations, the communication chip 906 is part of the processor 904.

Depending on its applications, computing device 900 may include other components that may or may not be physically and electrically coupled to the board 902. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 906 enables wireless communications for the transfer of data to and from the computing device 900. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 906 may implement any of a number of wireless standards or protocols, including but not limited to Wi-Fi (IEEE 802.1.1 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 900 may include a plurality of communication chips 906. For instance, a first communication chip 906 may be dedicated to shorter range wireless communications such as Wi-Fi and Bluetooth and a second communication chip 906 may be dedicated to longer range wireless communications such as GPS, EDGE, GPRS, CDMA, WiMAX, LTE, Ev-DO, and others.

The processor 904 of the computing device 900 includes an integrated circuit die packaged within the processor 904. The term "processor" may refer to any device or portion of a device that processes electronic data from registers and/or memory to transform that electronic data into other electronic data that may be stored in registers and/or memory. The communication chip 906 also includes an integrated circuit die packaged within the communication chip 906.

In various implementations, the computing device 900 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 900 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 10:
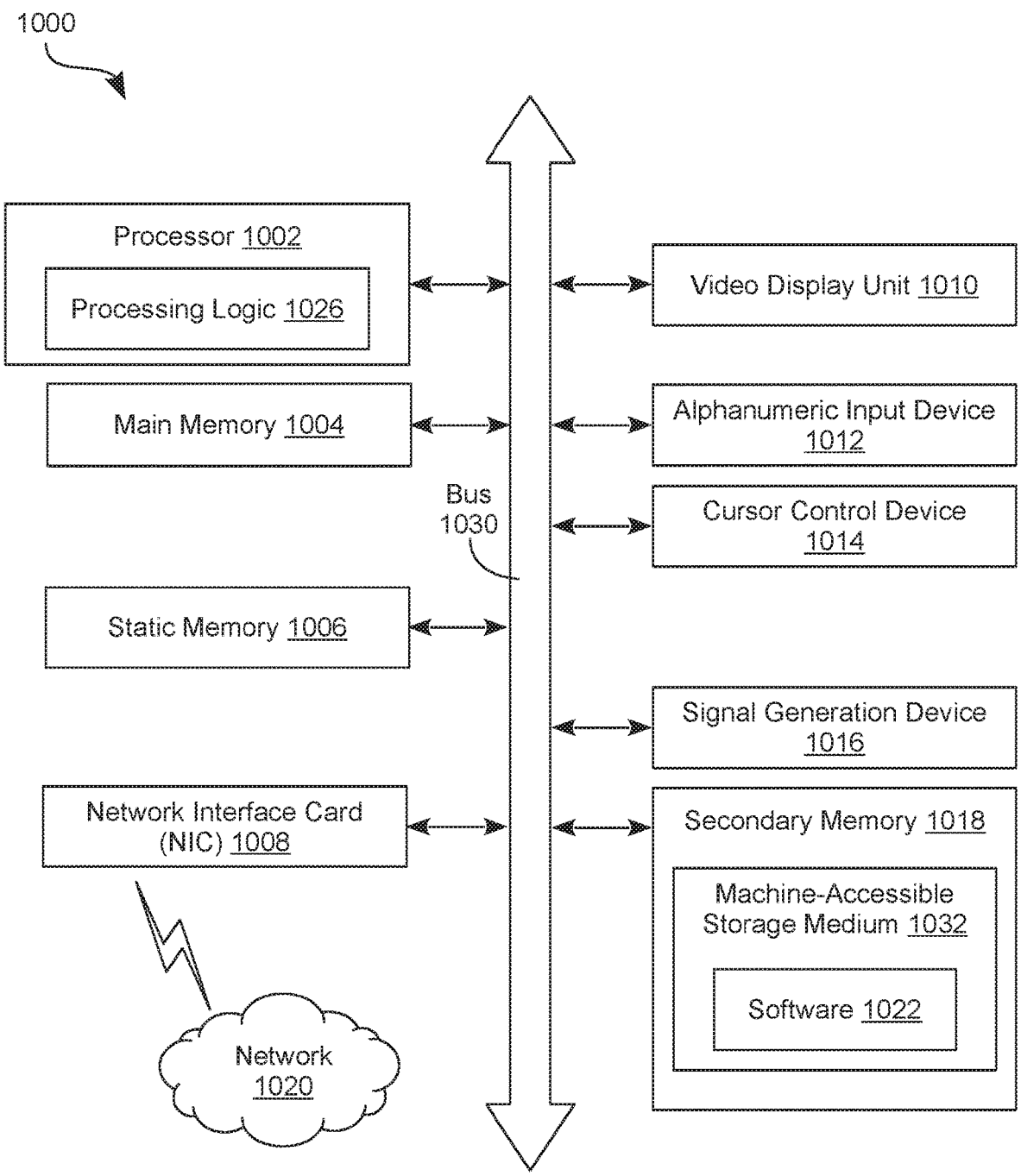
FIG. 10 is a functional block diagram illustrating an exemplary computer system, in accordance with one embodiment.

FIG. 10 illustrates a diagrammatic representation of a machine in the exemplary form of a computer system 1000 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 1000 includes a processor 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1018 (e.g., a data storage device), which communicate with each other via a bus 1030.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1002 may also be one or more special-purpose processing devices such as an application specific integrated circuit (ASIC), a field programmable gate array (FPGA), a digital signal processor (DSP), network processor, or the like. Processor 1002 is configured to execute the processing logic 1026 for performing the operations described herein.

The computer system 1000 may further include a network interface device 1008. The computer system 1000 also may include a video display unit 1010 (e.g., a liquid crystal display (LCD), a light emitting diode display (LED), or a cathode ray tube (CRT)), an alphanumeric input device 1012 (e.g., a keyboard), a cursor control device 1014 (e.g., a mouse), and a signal generation device 1016 (e.g., a speaker).

The secondary memory 1018 may include a machine-accessible storage medium (or more specifically a computer-readable storage medium) 1032 on which is stored one or more sets of instructions (e.g., software 1022) embodying any one or more of the methodologies or functions described herein. The software 1022 may also reside, completely or at least partially, within the main memory 1004 and/or within the processor 1002 during execution thereof by the computer system 1000, the main memory 1004 and the processor 1002 also constituting machine-readable storage media. The software 1022 may further be transmitted or received over a network 1020 via the network interface device 1008.

While the machine-accessible storage medium 1032 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

Example 1 is a computer device for video classification using a spiking neural network, the computer device comprising circuitry to receive at a spiking neural network one or more input signals including an encoded version of frames of differential video data which each include a respective pixel value representing a difference between a respective two frames of raw video data of a video sequence, and apply a spiking neural network to the one or more input signals, including circuitry to communicate one or more spike trains each between respective nodes of the spiking neural network, the one or more spike trains each based on the frames of differential video data. The circuitry is further to detect an output signal of the spiking neural network, the output signal based on the one or more spike trains, and based on the output signal, train the spiked neural network to recognize an activity type, or communicate a signal which classifies the video sequence as including a representation of an instance of the activity type.

In Example 2, the subject matter of Example 1 optionally includes wherein circuitry to train the spiked neural network to recognize the activity type is based on multiple reference video sequences which each represent a respective instance of the activity, wherein, of all reference video sequences used to train the network to recognize the activity, only one reference video sequence represents the activity from a first point-of-view.

In Example 3, the subject matter of Example 2 optionally includes wherein, of all reference video sequences used to train the network to recognize the activity, each reference video sequence represents the activity from a different respective point-of-view.

In Example 4, the subject matter of any one or more of Examples 1 and 2 optionally includes wherein the circuitry to train the spiked neural network to recognize the activity type based on one and only one reference video sequence.

In Example 5, the subject matter of any one or more of Examples 1, 2, and 4 optionally includes the computer device further comprising circuitry to prepare the spiking neural network to be trained, including circuitry to configure the spiking neural network based on a driven network model and an autonomous network model.

In Example 6, the subject matter of any one or more of Examples 1, 2, 4 and 5 optionally includes the computer device further comprising circuitry to encode raw video data of the video sequence into the frames of differential video data.

In Example 7, the subject matter of Example 6 optionally includes the computer device further comprising circuitry to convert the raw video data from a polychromatic color space format to a monochromatic color space format.

In Example 8, the subject matter of any one or more of Examples 1, 2 and 4-6 optionally includes the computer device further comprising circuitry to generate the one or more input signals based on the frames of differential video data, including circuitry to selectively exclude at least a portion a frame from a conversion to generate the one or more input signals.

In Example 9, the subject matter of Example 8 optionally includes wherein the circuitry to selectively exclude at least the portion the frame includes circuitry to selectively exclude the frame on a per-frame basis.

In Example 10, the subject matter of Example 8 optionally includes wherein the circuitry to selectively exclude at least the portion the frame includes circuitry to selectively exclude only a sub-frame portion of the frame on a per-sub-frame basis.

In Example 11, the subject matter of Example 8 optionally includes wherein the circuitry to selectively exclude at least the portion the frame based on a predetermined maximum threshold level amount of activity to be indicated by a frame or by a sub-frame portion of a frame.

In Example 12, the subject matter of Example 8 optionally includes wherein the circuitry to selectively exclude at least the portion the frame based on a predetermined minimum threshold level amount of activity to be indicated by a frame or by a sub-frame portion of a frame.

In Example 13, the subject matter of any one or more of Examples 1, 2 and 4-6 optionally includes the computer device further comprising circuitry to train a plurality of spiking neural networks each to recognize a different respective activity type, including circuitry to train a first spiking neural network to recognize a first activity type, compare, after the plurality of spiking neural networks are trained, multiple output signals each from a different respective one of the plurality of spiking neural networks, the output signals each based on a test video sequence, select among from the multiple output signals a first output signal of the first spiking neural network, and signaling, based on a selection of the first output signal, that the test video sequence includes a representation of an instance of the first activity type.

In Example 14, the subject matter of Example 13 optionally includes wherein the circuitry to compare the multiple output signals comprises circuitry to compare a measure of output signal spiking from each of the plurality of trained spiking neural networks.

Example 15 is at least one machine readable medium including instructions that, when executed by a machine, cause the machine to perform operations for video classification using a spiking neural network, the operations comprising receiving at a spiking neural network one or more input signals including an encoded version of frames of differential video data which each include a respective pixel value representing a difference between a respective two frames of raw video data of a video sequence, and applying a spiking neural network to the one or more input signals, including communicating one or more spike trains each between respective nodes of the spiking neural network, the one or more spike trains each based on the frames of differential video data. The operations further comprise detecting an output signal of the spiking neural network, the output signal based on the one or more spike trains, and based on the output signal, training the spiked neural network to recognize an activity type, or communicating a signal which classifies the video sequence as including a representation of an instance of the activity type.

In Example 16, the subject matter of Example 15 optionally includes wherein training the spiked neural network to recognize the activity type is based on multiple reference video sequences which each represent a respective instance of the activity, wherein, of all reference video sequences used to train the network to recognize the activity, only one reference video sequence represents the activity from a first point-of-view.

In Example 17, the subject matter of Example 16 optionally includes wherein, of all reference video sequences used to train the network to recognize the activity, each reference video sequence represents the activity from a different respective point-of-view.

In Example 18, the subject matter of any one or more of Examples 15 and 16 optionally includes wherein training the spiked neural network to recognize the activity type is based on one and only one reference video sequence.

In Example 19, the subject matter of any one or more of Examples 15, 16 and 18 optionally includes the operations further comprising preparing the spiking neural network to receive the training, including configuring the spiking neural network based on a driven network model and an autonomous network model.

In Example 20, the subject matter of any one or more of Examples 15, 16, 18 and 19 optionally includes the operations further comprising encoding raw video data of the video sequence into the frames of differential video data.

In Example 21, the subject matter of Example 20 optionally includes the operations further comprising converting the raw video data from a polychromatic color space format to a monochromatic color space format.

In Example 22, the subject matter of any one or more of Examples 15, 16 and 18-20 optionally includes the operations further comprising generating the one or more input signals based on the frames of differential video data, including selectively excluding at east a portion a frame from a conversion to generate the one or more input signals.

In Example 23, the subject matter of Example 22 optionally includes wherein selectively excluding at least the portion the frame includes selectively excluding the frame on a per-frame basis.

In Example 24, the subject matter of Example 22 optionally includes wherein selectively excluding at least the portion the frame includes selectively excluding only a sub-frame portion of the frame on a per-sub-frame basis.

In Example 25, the subject matter of Example 22 optionally includes wherein selectively excluding at least the portion the frame is based on a predetermined maximum threshold level amount of activity to be indicated by a frame or by a sub-frame portion of a frame.

In Example 26, the subject matter of Example 22 optionally includes wherein selectively excluding at least the portion the frame is based on a predetermined minimum threshold level amount of activity to be indicated by a frame or by a sub-frame portion of a frame.

In Example 27, the subject matter of any one or more of Examples 15, 16 and 18-20 optionally includes the operations further comprising training a plurality of spiking neural networks each to recognize a different respective activity type, including training a first spiking neural network to recognize a first activity type, after training the plurality of spiking neural networks, comparing multiple output signals each from a different respective one of the plurality of spiking neural networks, the output signals each based on a test video sequence, based on the comparing, selecting among from the multiple output signals a first output signal of the first spiking neural network, and based on the selecting the first output signal, signaling that the test video sequence includes a representation of an instance of the first activity type.

In Example 28, the subject matter of Example 27 optionally includes wherein comparing the multiple output signals comprises comparing a measure of output signal spiking from each of the plurality of trained spiking neural networks.

Example 29 is a method for video classification using a spiking neural network, the method comprising receiving at a spiking neural network one or more input signals including an encoded version of frames of differential video data which each include a respective pixel value representing a difference between a respective two frames of raw video data of a video sequence, and applying a spiking neural network to the one or more input signals, including communicating one or more spike trains each between respective nodes of the spiking neural network, the one or more spike trains each based on the frames of differential video data. The method further comprises detecting an output signal of the spiking neural network, the output signal based on the one or more spike trains, and based on the output signal, training the spiked neural network to recognize an activity type, or communicating a signal which classifies the video sequence as including a representation of an instance of the activity type.

In Example 30, the subject matter of Example 29 optionally includes wherein training the spiked neural network to recognize the activity type is based on multiple reference video sequences which each represent a respective instance of the activity, wherein, of all reference video sequences used to train the network to recognize the activity, only one reference video sequence represents the activity from a first point-of-view.

In Example 31, the subject matter of Example 30 optionally includes wherein, of all reference video sequences used to train the network to recognize the activity, each reference video sequence represents the activity from a different respective point-of-view.

In Example 32, the subject matter of any one or more of Examples 29 and 30 optionally includes wherein training the spiked neural network to recognize the activity type is based on one and only one reference video sequence.

In Example 33, the subject matter of any one or more of Examples 29, 30 and 32 optionally includes the method further comprising preparing the spiking neural network to receive the training, including configuring the spiking neural network based on a driven network model and an autonomous network model.

In Example 34, the subject matter of any one or more of Examples 29, 30, 32 and 33 optionally includes the method further comprising encoding raw video data of the video sequence into the frames of differential video data.

In Example 35, the subject matter of Example 34 optionally includes the method further comprising converting the raw video data from a polychromatic color space format to a monochromatic color space format.

In Example 36, the subject matter of any one or more of Examples 29, 30 and 32-34 optionally includes the method further comprising generating the one or more input signals based on the frames of differential video data, including selectively excluding at least a portion a frame from a conversion to generate the one or more input signals.

In Example 37, the subject matter of Example 36 optionally includes wherein selectively excluding at least the portion the frame includes selectively excluding the frame on a per-frame basis.

In Example 38, the subject matter of Example 36 optionally includes wherein selectively excluding at least the portion the frame includes selectively excluding only a sub-frame portion of the frame on a per-sub-frame basis.

In Example 39, the subject matter of Example 36 optionally includes wherein selectively excluding at least the portion the frame is based on a predetermined maximum threshold level amount of activity to be indicated by a frame or by a sub-frame portion of a frame.

In Example 40, the subject matter of Example 36 optionally includes wherein selectively excluding at least the portion the frame is based on a predetermined minimum threshold level amount of activity to be indicated by a frame or by a sub-frame portion of a frame.

In Example 41, the subject matter of any one or more of Examples 29, 30 and 32-34 optionally includes the method further comprising training a plurality of spiking neural networks each to recognize a different respective activity type, including training a first spiking neural network to recognize a first activity type, after training the plurality of spiking neural networks, comparing multiple output signals each from a different respective one of the plurality of spiking neural networks, the output signals each based on a test video sequence, based on the comparing, selecting among from the multiple output signals a first output signal of the first spiking neural network, and based on the selecting the first output signal, signaling that the test video sequence includes a representation of an instance of the first activity type.

In Example 42, the subject matter of Example 41 optionally includes wherein comparing the multiple output signals comprises comparing a measure of output signal spiking from each of the plurality of trained spiking neural networks.

Techniques and architectures for providing video classification with a spiking neural network are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A computer device for video classification using a spiking neural network, the computer device comprising circuitry to:

receive at a spiking neural network one or more input signals comprising an encoded version of a first plurality of frames of differential video data, wherein the first plurality of frames each correspond to both:
- a respective first frame of a second plurality of frames of a sequence of raw video data; and
- a respective second frame of the second plurality of frames; and wherein, for each frame of the first plurality of frames:
- multiple pixels of the frame each correspond to both:
  - a respective first pixel of the respective first frame; and
  - a respective second pixel of the respective second frame; and
- wherein, for each of the multiple pixels of the frame, a value of the pixel is to represent a difference between a value of the respective first pixel, and a value of the respective second pixel;

apply a spiking neural network to the one or more input signals, comprising circuitry to communicate one or more spike trains each between respective nodes of the spiking neural network, the one or more spike trains each based on the first plurality of frames; and detect an output signal of the spiking neural network, the output signal based on the one or more spike trains; and based on the output signal:
- train the spiking neural network to recognize an activity type; or
- communicate a signal which classifies the sequence of the raw video data as comprising a representation of an instance of the activity type.

2. The computer device of claim 1, wherein the circuitry is to train the spiking neural network to recognize the activity type based on multiple reference video sequences which each represent a respective instance of the activity type, wherein, of all reference video sequences used to train the spiking neural network to recognize the activity type, only one reference video sequence represents the activity type from a first point-of-view.

3. The computer device of claim 2, wherein, of all reference video sequences used to train the spiking neural network to recognize the activity type, each reference video sequence represents the activity type from a different respective point-of-view.

4. The computer device of claim 1, further comprising circuitry to prepare the spiking neural network to be trained, comprising circuitry to configure the spiking neural network based on a driven network model and an autonomous network model.

5. The computer device of claim 1, further comprising circuitry to encode the raw video data of the video sequence into the first plurality of frames.

6. The computer device of claim 5, further comprising circuitry to convert the raw video data from a polychromatic color space format to a monochromatic color space format.

7. The computer device of claim 1, further comprising circuitry to generate the one or more input signals based on the first plurality of frames, comprising circuitry to selectively exclude at least a portion of a frame from a conversion to generate the one or more input signals.

8. The computer device of claim 7, wherein the circuitry to selectively exclude at least the portion of the frame includes circuitry to selectively exclude the frame on a per-frame basis.

9. The computer device of claim 7, wherein the circuitry to selectively exclude at least the portion of the frame includes circuitry to selectively exclude only a sub-frame portion of the frame on a per-sub-frame basis.

10. The computer device of claim 7, wherein the circuitry to selectively exclude at least the portion of the frame based on a predetermined maximum threshold level amount of activity to be indicated by the frame or by a sub-frame portion of the frame.

11. The computer device of claim 7, wherein the circuitry to selectively exclude at least the portion of the frame based on a predetermined minimum threshold level amount of activity to be indicated by the frame or by a sub-frame portion of the frame.

12. The computer device of claim 1, further comprising circuitry to:
- train a plurality of spiking neural networks each to recognize a different respective activity type, comprising circuitry to train a first spiking neural network to recognize a first activity type;
- compare, after the plurality of spiking neural networks are trained, multiple output signals each from a different respective one of the plurality of spiking neural networks, the output signals each based on a test video sequence;
- select among from the multiple output signals a first output signal of the first spiking neural network; and
- signal, based on a selection of the first output signal, that the test video sequence includes a representation of an instance of the first activity type.

13. The computer device of claim 12, wherein the circuitry to compare the multiple output signals comprises circuitry to compare a measure of output signal spiking from each of the plurality of trained spiking neural networks.

14. The computer device of claim 1, wherein the circuitry is to train the spiking neural network to recognize the activity type based on one and only one reference video sequence.

15. At least one non-transitory_machine readable medium including instructions that, when executed by a machine, cause the machine to perform operations for video classification using a spiking neural network, the operations comprising:
- receiving at a spiking neural network one or more input signals comprising an encoded version of a first plurality of frames of differential video data, wherein the first plurality of frames each correspond to both:
  - a respective first frame of a second plurality of frames of a sequence of raw video data; and
  - a respective second frame of the second plurality of frames; and wherein, for each frame of the first plurality of frames:
- multiple pixels of the frame each correspond to both:
  - a respective first pixel of the respective first frame; and
  - a respective second pixel of the respective second frame; and
- wherein, for each of the multiple pixels of the frame, a value of the pixel represents a difference between a value of the respective first pixel, and a value of the respective second pixel;

applying a spiking neural network to the one or more input signals, comprising communicating one or more spike trains each between respective nodes of the spiking neural network, the one or more spike trains each based on the first plurality of frames; and detecting an output signal of the spiking neural network, the output signal based on the one or more spike trains; and based on the output signal:
    training the spiking neural network to recognize an activity type; or
    communicating a signal which classifies the sequence of the raw video data as comprising a representation of an instance of the activity type.

16. The at least one non-transitory machine readable medium of claim 15, wherein training the spiking neural network to recognize the activity type is based on multiple reference video sequences which each represent a respective instance of the activity type, wherein, of all reference video sequences used to train the spiking neural network to recognize the activity type, only one reference video sequence represents the activity type from a first point-of-view.

17. The at least one non-transitory machine readable medium of claim 16, wherein, of all reference video sequences used to train the spiking neural network to recognize the activity type, each reference video sequence represents the activity type from a different respective point-of-view.

18. The at least one non-transitory machine readable medium of claim 15, wherein training the spiking neural network to recognize the activity type is based on one and only one reference video sequence.

19. The at least one non-transitory machine readable medium of claim 15, the operations further comprising preparing the spiking neural network to receive the training, comprising configuring the spiking neural network based on a driven network model and an autonomous network model.

20. The at least one non-transitory machine readable medium of claim 15, the operations further comprising encoding the raw video data of the video sequence into the first plurality of frames of differential video data.

21. A method for video classification using a spiking neural network, the method comprising:
    receiving at a spiking neural network one or more input signals comprising an encoded version of a first plurality of frames of differential video data respective pixel value representing, wherein the first plurality of frames each correspond to both:
        a respective first frame of a second plurality of frames of a sequence of raw video data; and
        a respective second frame of the second plurality of frames; and
    wherein, for each frame of the first plurality of frames:
        multiple pixels of the frame each correspond to both:
            a respective first pixel of the respective first frame; and
            a respective second pixel of the respective second frame; and
        wherein, for each of the multiple pixels of the frame, a value of the pixel represents a difference between a value of the respective first pixel, and a value of the respective second pixel;
    applying a spiking neural network to the one or more input signals, comprising communicating one or more spike trains each between respective nodes of the spiking neural network, the one or more spike trains each based on the first plurality of frames; and
    detecting an output signal of the spiking neural network, the output signal based on the one or more spike trains; and
    based on the output signal:
        training the spiking neural network to recognize an activity type; or
        communicating a signal which classifies the sequence of the raw video data as comprising a representation of an instance of the activity type.

22. The method of claim 21, wherein training the spiking neural network to recognize the activity type is based on multiple reference video sequences which each represent a respective instance of the activity type, wherein, of all reference video sequences used to train the spiking neural network to recognize the activity type, only one reference video sequence represents the activity type from a first point-of-view.

23. The method of claim 22, wherein, of all reference video sequences used to train the spiking neural network to recognize the activity type, each reference video sequence represents the activity type from a different respective point-of-view.

24. The method of claim 21, wherein training the spiking neural network to recognize the activity type is based on one and only one reference video sequence.

25. The method of claim 21, further comprising preparing the spiking neural network to receive the training, including comprising configuring the spiking neural network based on a driven network model and an autonomous network model.

* * * * *